(12) United States Patent
Hugh

(10) Patent No.: US 12,117,811 B1
(45) Date of Patent: *Oct. 15, 2024

(54) ROUTE BASED MANUFACTURING SYSTEM ANALYSIS, APPARATUSES, SYSTEMS, AND METHODS

(71) Applicant: SCHEMAPORT, LLC, Bellevue, WA (US)

(72) Inventor: Steven Clair Hugh, Bellevue, WA (US)

(73) Assignee: SCHEMAPORT, LLC, Bellevue, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/143,223

(22) Filed: May 4, 2023

Related U.S. Application Data

(60) Continuation of application No. 17/157,606, filed on Jan. 25, 2021, now Pat. No. 11,675,339, which is a division of application No. 15/216,533, filed on Jul. 21, 2016, now Pat. No. 10,921,788.

(60) Provisional application No. 62/282,058, filed on Jul. 24, 2015.

(51) Int. Cl.
*G05B 19/41* (2006.01)
*G05B 19/418* (2006.01)
*G06F 16/28* (2019.01)

(52) U.S. Cl.
CPC ..... *G05B 19/41865* (2013.01); *G06F 16/283* (2019.01); *G05B 2219/31382* (2013.01); *Y02P 90/02* (2015.11)

(58) Field of Classification Search
CPC .... G05B 19/41865; G05B 2219/31382; G06F 16/283; Y02P 90/02
See application file for complete search history.

(56) References Cited

U.S. PATENT DOCUMENTS

| | | | | |
|---|---|---|---|---|
| 7,752,085 | B2 * | 7/2010 | Monroe | G16H 20/17 705/28 |
| 8,467,951 | B2 * | 6/2013 | Husain | G01C 21/3461 701/414 |
| 9,836,332 | B2 * | 12/2017 | Syed | G06F 8/76 |
| 9,906,510 | B2 * | 2/2018 | Panchapakesan | H04L 63/08 |
| 9,948,492 | B2 * | 4/2018 | Jung | H04L 69/329 |

(Continued)

*Primary Examiner* — Mohammed Shamsuzzaman
(74) *Attorney, Agent, or Firm* — PELOQUIN, PLLC; Mark S. Peloquin, Esq.

(57) ABSTRACT

Systems and methods are described to provide product and process improvement of a product. A manufacturing route has a manufacturing route key. The manufacturing route is configured to accept data from a client machine. The data is associated with the manufacturing route key using the multidimensional data warehouse schema to form multidimensional manufacturing route data. The multidimensional manufacturing route data is stored in the multidimensional manufacturing route database. The manufacturing route key identifies the manufacturing route from a plurality of manufacturing routes within the multidimensional manufacturing route database. A processor is configured to receive an input. The input is a cause added in response to a symptom wherein a symptom/cause relationship is established to provide a basis for product and process improvement using data that is extracted from the multidimensional manufacturing route database.

18 Claims, 20 Drawing Sheets

(56) References Cited

U.S. PATENT DOCUMENTS

| | | | |
|---|---|---|---|
| 2005/0075748 A1* | 4/2005 | Gartland | G05B 19/4189 700/108 |
| 2005/0097012 A1* | 5/2005 | Maeda | G06Q 10/06 705/28 |
| 2007/0017291 A1* | 1/2007 | Cypes | B01D 3/322 73/590 |
| 2007/0038464 A1* | 2/2007 | Sato | G05B 19/4183 358/1.17 |
| 2007/0299634 A1* | 12/2007 | Bhattacharya | G06Q 10/06 707/999.001 |
| 2008/0046134 A1* | 2/2008 | Bruce | G01C 21/005 701/1 |
| 2008/0172574 A1* | 7/2008 | Fisher | G06N 5/02 714/25 |
| 2009/0083374 A1* | 3/2009 | Saint Clair | H04L 12/2832 709/203 |
| 2009/0228129 A1* | 9/2009 | Moyne | G06Q 10/06 706/47 |
| 2010/0023151 A1* | 1/2010 | Shieh | G05B 19/41885 700/121 |
| 2011/0046769 A1* | 2/2011 | Nakano | G06Q 10/06 700/106 |
| 2011/0113393 A1* | 5/2011 | Sezginer | G06F 30/394 716/126 |
| 2012/0078504 A1* | 3/2012 | Zhou | G01C 21/3685 701/411 |
| 2012/0278622 A1* | 11/2012 | Lesavich | G06F 16/951 713/168 |
| 2013/0123964 A1* | 5/2013 | Cooper | G06F 3/067 700/97 |
| 2014/0189792 A1* | 7/2014 | Lesavich | H04W 4/60 726/3 |
| 2015/0088844 A1* | 3/2015 | Stigsen | G06F 16/22 707/703 |
| 2015/0278721 A1* | 10/2015 | Oku | G06Q 10/063 705/7.11 |
| 2015/0281356 A1* | 10/2015 | Maturana | G06F 9/5072 709/217 |
| 2016/0321654 A1* | 11/2016 | Lesavich | H04L 67/104 |
| 2017/0331794 A1* | 11/2017 | Lokman | H04L 63/0428 |

\* cited by examiner

| Row Labels (950) | Column Label 2012-W01 (952) Tested | Yield | 2012-W02 (954) Tested | Yield | 2012-W03 (956) Tested | Yield | 2012-W04 (958) Tested | Yield | 2012-W05 (960) Tested | Yield | Total Tested (962) | Total Yield (964) |
|---|---|---|---|---|---|---|---|---|---|---|---|---|
| ESS (902) | | | 54 | 99.4% | | | | | | | 54 | 99.4% |
| ESS No 2 | | | 27 | 98.8% | | | | | | | 27 | 98.8% |
| ESS No 3 | | | 18 | 100.0% | | | | | | | 18 | 100.0% |
| ESS No 5 | | | 9 | 100.0% | | | | | | | 9 | 100.0% |
| Final-Test (906) | | | 99 | 100.0% | | | 2 | 100.0% | | | 102 | 100.0% |
| Final-Test 1 (908) | | | 76 | 100.0% | 1 | | 2 | 100.0% | | | 79 | 100.0% |
| Final-Test 1 | | | 23 | 100.0% | 1 | | | | | | 23 | 100.0% |
| Hand-Solder (910) | | | 79 | 100.0% | | | 2 | 100.0% | | | 79 | 100.0% |
| HS Station 1 (912) | | | 79 | 100.0% | | | 1 | 100.0% | | | 79 | 100.0% |
| ICT (914) | | | 111 | 97.8% | | | 1 | 100.0% | | | 113 | 98.2% |
| ICT 1 (916) | | | 43 | 98.4% | | | | | | | 44 | 96.5% |
| ICT 2 | | | 32 | 100.0% | | | | | | | 32 | 100.0% |
| ICT 3 | | | 36 | 97.4% | | | | | | | 37 | 98.1% |
| ORT (918) | | | 4 | 100.0% | | | | | 4 | 100.0% | 8 | 100.0% |
| Life Test 2 (920) | | | 4 | 100.0% | | | | | 4 | 100.0% | 8 | 100.0% |
| Rework (922) | 7 | 100.0% | 10 | 100.0% | | | 1 | 100.0% | | | 18 | 100.0% |
| Rework (924) | 7 | 100.0% | 10 | 100.0% | | | 1 | 100.0% | | | 18 | 100.0%z |

FIG. 9A

| | | | | | | | | | | | | |
|---|---|---|---|---|---|---|---|---|---|---|---|---|
| 926 — Serialization | 100 | 100.0% | | | | | | | | | 100 | 100.0% |
| 928 — Serializer 1 | 100 | 100.0% | | | | | | | | | 100 | 100.0% |
| 930 — Ship | | | 93 | 100.0% | 3 | 100.0% | | | 1 | 100.0% | 97 | 100.0% |
| 932 — Ship Station 1 | | | 93 | 100.0% | 3 | 100.0% | | | 1 | 100.0% | 97 | 100.0% |
| 934 — SMT-Bottom | 100 | 100.0% | | | | | | | | | 100 | 100.0% |
| 936 — SMT-Line | 100 | 100.0% | | | | | | | | | 100 | 100.0% |
| 938 — SMT-Top | 36 | 100.0% | 64 | 100.0% | | | | | | | 100 | 100.0% |
| 940 — SMT-Line 1 | 36 | 100.0% | 64 | 100.0% | | | | | | | 100 | 100.0% |
| 942 — Wash | | | 109 | 100.0% | | | 1 | 100.0% | | | 110 | 100.0% |
| 944 — Wash Line 2 A | | | 109 | 100.0% | | | 1 | 100.0% | | | 110 | 100.0% |
| 946 — Wash-Bottom | 98 | 100.0% | | | | | | | | | 98 | 100.0% |
| 948 — Wash Line 2 B | 98 | 100.0% | | | | | | | | | 98 | 100.0% |
| 950 — Wash-Top | 36 | 100.0% | 64 | 100.0% | | | | | | | 100 | 100.0% |
| 952 — Wash Line 2 D | 36 | 100.0% | 64 | 100.0% | | | | | | | 100 | 100.0% |
| Grand Total | 377 | 99.4% | 687 | 99.4% | 4 | 100.0% | 6 | 100.0% | 5 | 100.0% | 1079 | 99.6% |

FIG. 9B

| Variable Name | Variable Name | VariableLSL | VariableSL | VariableValue | VariableUCL | VariableUSL | Variable Status | Variable SLFail | Variable CLFail | Variable UCLFail | Variable USLFail |
|---|---|---|---|---|---|---|---|---|---|---|---|
| C175 | F | 0.000001936 | 2.03853E-06 | 2.19143E-06 | 2.28982E-06 | 0.000002464 | 1 | 0 | 0 | 0 | 0 |
| C175 | F | 0.000001936 | 2.03853E-06 | 2.12623E-06 | 2.28982E-06 | 0.000002464 | 1 | 0 | 0 | 0 | 0 |
| C175 | F | 0.000001936 | 2.03853E-06 | 2.17254E-06 | 2.28982E-06 | 0.000002464 | 1 | 0 | 0 | 0 | 0 |
| C175 | F | 0.000001936 | 2.03853E-06 | 2.18791E-06 | 2.28982E-06 | 0.000002464 | 1 | 0 | 0 | 0 | 0 |
| C175 | F | 0.000001936 | 2.03853E-06 | 2.1794E-06 | 2.28982E-06 | 0.000002464 | 1 | 0 | 0 | 0 | 0 |
| C175 | F | 0.000001936 | 2.03853E-06 | 2.18821E-06 | 2.28982E-06 | 0.000002464 | 1 | 0 | 0 | 0 | 0 |
| C175 | F | 0.000001936 | 2.03853E-06 | 2.14273E-06 | 2.28982E-06 | 0.000002464 | 1 | 0 | 0 | 0 | 0 |
| C175 | F | 0.000001936 | 2.04871E-06 | 2.21414E-06 | 2.29658E-06 | 0.000002464 | 1 | 0 | 0 | 0 | 0 |
| C175 | F | 0.000001936 | 2.04871E-06 | 2.19729E-06 | 2.29658E-06 | 0.000002464 | 1 | 0 | 0 | 0 | 0 |
| C175 | F | 0.000001936 | 2.04871E-06 | 2.33109E-06 | 2.29658E-06 | 0.000002464 | 1 | 0 | 0 | 1 | 0 |
| C175 | F | 0.000001936 | 2.04871E-06 | 2.012554E-06 | 2.29658E-06 | 0.000002464 | 1 | 0 | 0 | 0 | 0 |
| C175 | F | 0.000001936 | 2.04871E-06 | 2.17765E-06 | 2.29658E-06 | 0.000002464 | 1 | 0 | 0 | 0 | 0 |
| C175 | F | 0.000001936 | 2.04871E-06 | 2.15324E-06 | 2.29658E-06 | 0.000002464 | 1 | 0 | 0 | 0 | 0 |
| C175 | F | 0.000001936 | 2.04871E-06 | 2.18599E-06 | 2.29658E-06 | 0.000002464 | 1 | 0 | 0 | 0 | 0 |
| C175 | F | 0.000001936 | 2.04871E-06 | 2.18034E-06 | 2.29658E-06 | 0.000002464 | 1 | 0 | 0 | 0 | 0 |
| C175 | F | 0.000001936 | 2.04871E-06 | 2.20056E-06 | 2.29658E-06 | 0.000002464 | 1 | 0 | 0 | 0 | 0 |
| C175 | F | 0.000001936 | 2.04871E-06 | 2.16147E-06 | 2.29658E-06 | 0.000002464 | 1 | 0 | 0 | 0 | 0 |
| C175 | F | 0.000001936 | 2.04871E-06 | 2.17203E-06 | 2.29658E-06 | 0.000002464 | 1 | 0 | 0 | 0 | 0 |
| C175 | F | 0.000001936 | 2.04871E-06 | 2.14431E-06 | 2.29658E-06 | 0.000002464 | 1 | 0 | 0 | 0 | 0 |
| C175 | F | 0.000001936 | 2.04871E-06 | 2.08856E-06 | 2.29658E-06 | 0.000002464 | 1 | 0 | 0 | 0 | 0 |
| C175 | F | 0.000001936 | 2.04871E-06 | 2.1771E-06 | 2.29658E-06 | 0.000002464 | 1 | 0 | 0 | 0 | 0 |

FAILED UPPER CONTROL LIMIT 1130

FIG. 11

Many Routes

| | | | | | | | | | | | | |
|---|---|---|---|---|---|---|---|---|---|---|---|---|
| 8 | Acme Products | Suzhou | ICT | Product | HP3070-1 | ✓ | ✓ | ✓ | ✓ | Edit Insert | Delete | Up Down |
| 9 | Acme Products | Suzhou | ICT | Product | HP3070-3 | ✓ | ✓ | ✓ | ✓ | Edit Insert | Delete | Up Down |
| 10 | Acme Products | Suzhou | ICT | Product | HP3070-6 | ✓ | ✓ | ✓ | ✓ | Edit Insert | Delete | Up Down |
| 11 | Acme Products | Suzhou | ESS | Product | ESS No 2 | ✓ | ✓ | ✓ | ✓ | Edit Insert | Delete | Up Down |
| 12 | Acme Products | Suzhou | ESS | Product | ESS No 3 | ✓ | ✓ | ✓ | ✓ | Edit Insert | Delete | Up Down |
| 13 | Acme Products | Suzhou | ESS | Product | ESS No 5 | ✓ | ✓ | ✓ | ✓ | Edit Insert | Delete | Up Down |
| 14 | Acme Products | Suzhou | Final Test | Product | T03467 No 2 | ✓ | ✓ | ✓ | ✓ | Edit Insert | Delete | Up Down |
| 15 | Acme Products | Suzhou | Final Test | Product | T03467 No 5 | ✓ | ✓ | ✓ | ✓ | Edit Insert | Delete | Up Down |
| 16 | Acme Products | Suzhou | Rework | Product | Rework | ✓ | ✓ | ✓ | ✓ | Edit Insert | Delete | Up Down |
| 17 | Acme Products | Suzhou | ORT | Product | Life Test 2 | ✓ | ✓ | ✓ | ✓ | Edit Insert | Delete | Up Down |
| 18 | Acme Products | Suzhou | Ship | Product | Ship Station 1 | ✓ | ✓ | ✓ | ✓ | Edit Insert | Delete | Up Down |

{ 1202 }   { 1204 }   { 1206 }

Configuration example

FIG. 12 A1

Routes

| | Account | Network | Business | Product | Lifecycle | Status |
|---|---|---|---|---|---|---|
| | EightTwentySolutions Test | High Reliability Products | Medical | Monitors | Production | Ready |

< Back

Route Data ets_admin@schemaport.com

| | Process | Schema | Manufacturer | Location | Client | Verified | Sync Status | Report Status | Monitor Status | Route Edit | Route Delete | Move |
|---|---|---|---|---|---|---|---|---|---|---|---|---|
| 1 | Sales_Order | Product | Acme | Seattle | Oxfhcjtm | | ✓ | ✓ | ✓ | Edit Insert | Delete | Up Down Users |
| 2 | Parts_Kit | Process | Universal | Malaysia | stock_room | | ✓ | ✓ | ✓ | Edit Insert | Delete | Up Down Users |
| 3 | Assembly | Product | Universal | Malaysia | work_cell_9 | | ✓ | ✓ | ✓ | Edit Insert | Delete | Up Down Users |
| 4 | Ship_To_Stock | Product | Universal | Malaysia | ship_center_1 | | ✓ | ✓ | ✓ | Edit Insert | Delete | Up Down Users |
| 5 | Inspection | Product | Acme | Seattle | inspection_station_1 | | ✓ | ✓ | ✓ | Edit Insert | Delete | Up Down Users |
| 6 | Ship_To_Customer | Product | Acme | Seattle | shipping | | ✓ | ✓ | ✓ | Edit Insert | Delete | Up Down Users |
| 7 | Field_Performance_Tracking | Product | Acme | Seattle | tracker | | ✓ | ✓ | ✓ | Edit Insert | Delete | Up Down Users |
| 8 | Refurbishment | Product | Universal | Malaysia | refurb_center_1 | | ✓ | ✓ | ✓ | Edit Insert | Delete | Up Down Users |

FIG. 12 B

ROUTE BASED MANUFACTURING SYSTEM ANALYSIS, APPARATUSES, SYSTEMS, AND METHODS

RELATED APPLICATIONS

This patent application is a Continuation of U.S. Non-Provisional Pat. No. 17,157,606 filed on Jan. 25, 2021, entitled "ROUTE BASED MANUFACTURING SYSTEM ANALYSIS. APPARATUSES, SYSTEMS, AND METHODS" which is a Divisional of U.S. Non-Provisional patent application Ser. No. 15/216,533 filed on Jul. 21, 2016, entitled "ROUTE BASED MANUFACTURING SYSTEM ANALYSIS, APPARATUSES, SYSTEMS, AND METHODS," which claims priority from U.S. Provisional Patent Application No. 62/282,058 entitled "CLOUD BASED DATA TRANSMISSION AND RETRIEVAL," filed on Jul. 24, 2015. U.S. Provisional Patent Application No. 62/282,058 entitled "CLOUD BASED DATA TRANSMISSION AND RETRIEVAL," is hereby fully incorporated by reference. U.S. Non-Provisional patent application Ser. No. 15/216,533 entitled "CLOUD BASED DATA TRANSMISSION AND RETRIEVAL," is hereby fully incorporated by reference. U.S. Non-Provisional Pat. No. 17,157,606 entitled "CLOUD BASED DATA TRANSMISSION AND RETRIEVAL," is hereby fully incorporated by reference.

BACKGROUND OF THE INVENTION

1. Field of Invention

The invention relates generally to improving manufacturing systems and more specifically to increasing the value of a manufacturing system and the products produced by the manufacturing system.

2. Art Background

Modern manufacturing in the information age can generate information related to the steps of a manufacturing system. Thus, information is compartmentalized by the steps of the manufacturing system. At some point in time a product can fail during its service life following manufacture. This can present a problem which requires a technical solution. In other situations product waste occurs in a manufacturing system which lowers yield. This can present a problem which requires a technical solution.

The global economy has contributed to the compartmentalization of the steps of a manufacturing system by virtue of the fact that a manufacturing system can be spread out across the geography of the globe. Information generated in such a distributed system is compartmentalized since the information is generated by each step during manufacture. At some point a product can fail during its service life following manufacture. This can present a problem which requires a technical solution. In other situations product waste occurs in a manufacturing system which lowers yield. This can present a problem which requires a technical solution.

BRIEF DESCRIPTION OF THE DRAWINGS

The invention may best be understood by referring to the following description and accompanying drawings that are used to illustrate embodiments of the invention. The invention is illustrated by way of example in the embodiments and is not limited in the figures of the accompanying drawings, in which like references indicate similar elements.

FIG. 9A-9B illustrates an example of data reporting, according to embodiments of the invention.

FIG. 11 illustrates an example of variables aggregation, according to embodiments of the invention.

FIGS. 12A-12A1 illustrate creating manufacturing data routes, according to embodiments of the invention.

FIG. 12B illustrates a structure of manufacturing data routes, according to embodiments of the invention.

DETAILED DESCRIPTION

In the following detailed description of embodiments of the invention, reference is made to the accompanying drawings in which like references indicate similar elements, and in which is shown by way of illustration, specific embodiments in which the invention may be practiced. These embodiments are described in sufficient detail to enable those of skill in the art to practice the invention. In other instances, well-known circuits, structures, and techniques have not been shown in detail in order not to obscure the understanding of this description. The following detailed description is, therefore, not to be taken in a limiting sense, and the scope of the invention is defined only by the appended claims.

Systems and methods are described for increasing value of a product produced by a manufacturing system. In some embodiments, the useful lifetime of a product is increased because problems that limit product lifetime are uncovered during the manufacture of the product and are corrected within the manufacturing system. In other embodiments, the time to market is decreased because problems that exist in the development phase of a product can be uncovered and eliminated. Embodiments of the invention are applicable to various types product manufacture including drug development.

Figure 1:
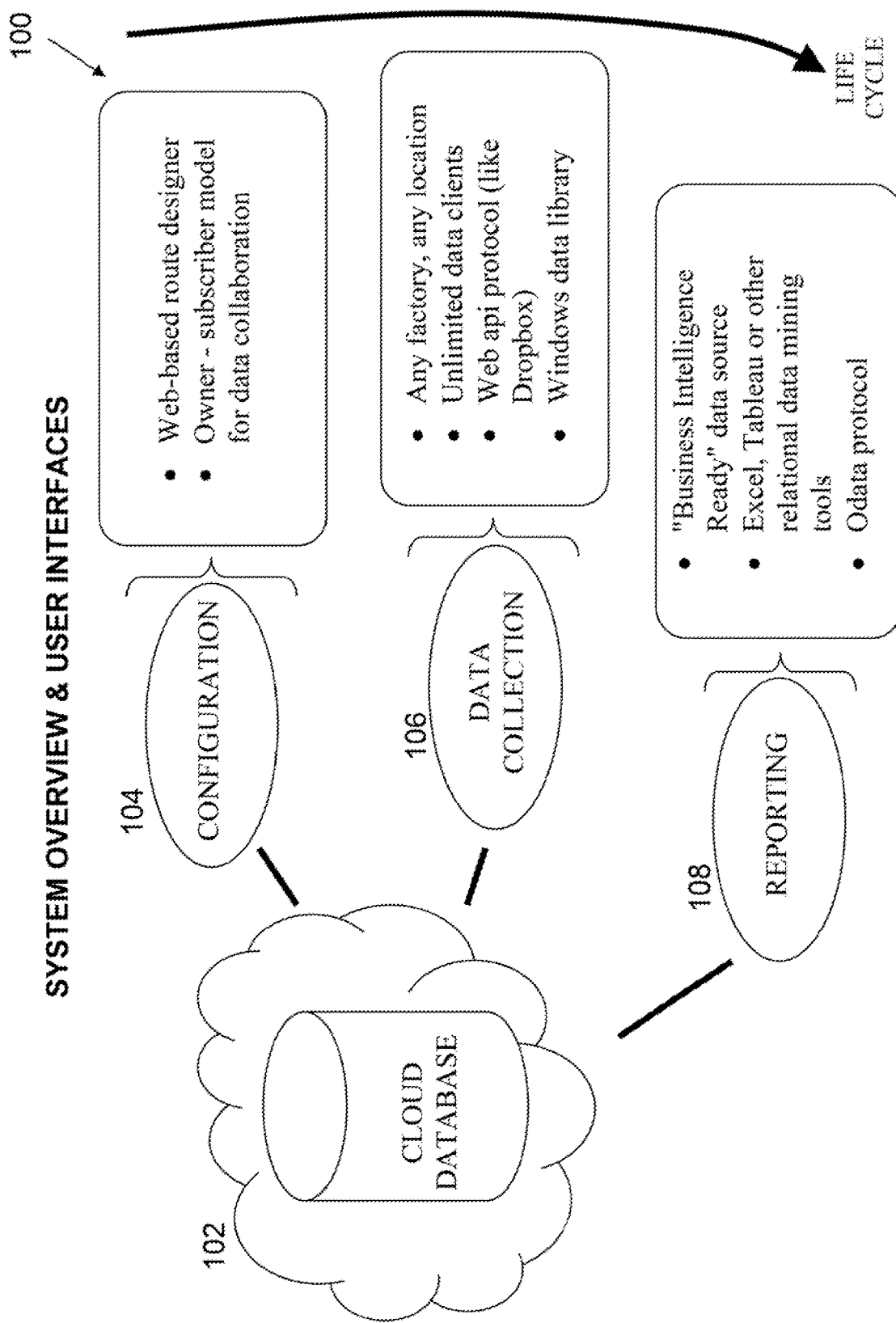
FIG. 1 illustrates configuring manufacturing routes into an integrated manufacturing data collection system, according to embodiments of the invention.

FIG. 1 illustrates configuring manufacturing routes into an integrated manufacturing data collection system, according to embodiments of the invention. With reference to FIG. 1, a database 102 contains multidimensional data which is collected during the manufacture of a product, referred to herein as multidimensional manufacturing route data. At 104, a user configures the multidimensional manufacturing routes for the data collection. Configuration of the manufacturing routes at 104 can be done in a variety of ways for a variety of industries to which the embodiments of the invention are applied. A schema is used to organize the data collection from the various multidimensional manufacturing routes that are associated with a route structure for the manufacture of a given product. As used in this description of embodiments, a "route structure" is a plurality of multidimensional manufacturing routes which are used to collect data flowing from a given manufacturing system. A "route structure" is described more fully below in conjunction with the figures that follow. Also as used in this description of embodiments, the term "data route" or "route" is used interchangeably to refer to a multidimensional manufacturing route.

At 106, data collection proceeds from the various manufacturing routes that have been configured at 104. Data collection can include data collected from any factory, at any location, for any manufacturing route associated with the manufacturing system 100 for a given product or products.

At 108 reporting is provided on the manufacturing route structure contained within the multidimensional manufacturing route database of 102. Reporting provides insight which enables a user to understand a variety of aspects of a manufacturing system, such as for example product yield from the manufacturing process at both the global manufacturing system level and from within a given manufacturing route. Examples of reporting will be discussed more fully below in conjunction with the figures that follow. Reporting enables an understanding of the variables that effect product yield. However, reporting is not limited to understanding product yield. In various embodiments, reporting is used to understand product quality by understanding how close a product is to specification limits or control limits. In various embodiments, reporting is applied to the post production life of the product and is used to measure customer satisfaction. In yet other embodiments, a structure of manufacturing routes encompasses the full lifecycle of a product (cradle-to-grave) thereby collecting data that is produced during the life of the product and feeding that data back into the manufacturing system into to make changes that can extend product life.

The collected data is mapped directly to a multidimensional data warehouse schema, instead of an interim schema which is common practice in the IT industry. The lack of an interim schema speeds up the data collection and reduces complexity. In the description of embodiments presented herein a single schema is used to both collect the data and to report the data. The single schema used herein is based on the construct of the multidimensional manufacturing route. Data routes can be re-defined once the data collection has started by aliasing the route view from the data schema. Thus, a schema bus architecture is applied to product manufacturing at the manufacturing route level to create a multidimensional manufacturing route database. This architecture permits a single database to be deployed and used for any product manufacturing. The single database resulting from the schema described herein eliminates the need for intermediate transformations of the data. Intermediate data transformations introduce noise and are undesirable.

In one or more embodiments, a variables controller(s) creates one or more reports which illustrate how a variable is proceeding as a function of time. For example, whether the variable is going in or out of process limits is illustrated in the reports. In other examples, a variables controller is used to assess whether a variable is approaching a process limit and to what degree the variable has traveled within the acceptable range specified by the process limit. Corrective action can be taken based on the output from the variables controller to make changes to the manufacturing system before waste occurs or before a threshold is crossed. Thereby increasing value within the manufacturing system. Yield increases by eliminating or minimizing waste through the manufacture of parts that are out of specification.

FIG. 1 also illustrates some of the user interfaces which are configured with the cloud database 102. The interface is configured using a web based route designer and an Owner/Subscriber model for data collaboration. The data collection interface allows data to be collected from any factory at any location, with unlimited clients, can use a Web application programming interface (api) protocol (such as Dropbox™ uses) and can use a Windows data library. The reporting mechanisms allow the use of "Business Intelligence Ready" data sources and can use Excel, Tableau or other relational data mining tools. The Open Data Protocol (Odata) protocol can also be used, in one or more embodiments. The OData Protocol is an open protocol to allow the creation and consumption of queryable and interoperable RESTful APIs in a simple and standard way. Security is implemented at the Manufacturing Route and User level, so data access for every Manufacturing Route can be controlled for any user independently. Embodiments of the invention can have their own data language that is invoked through the abovementioned Odata calls. The query parts implemented in the calling part of the method are embedded deep in the query procedures allowing specific, targeted data access with the database 102. The importance of this lies in the fact that with large databases too much data can overwhelm the analysis and tools being used to retrieve the data.

Figure 2:
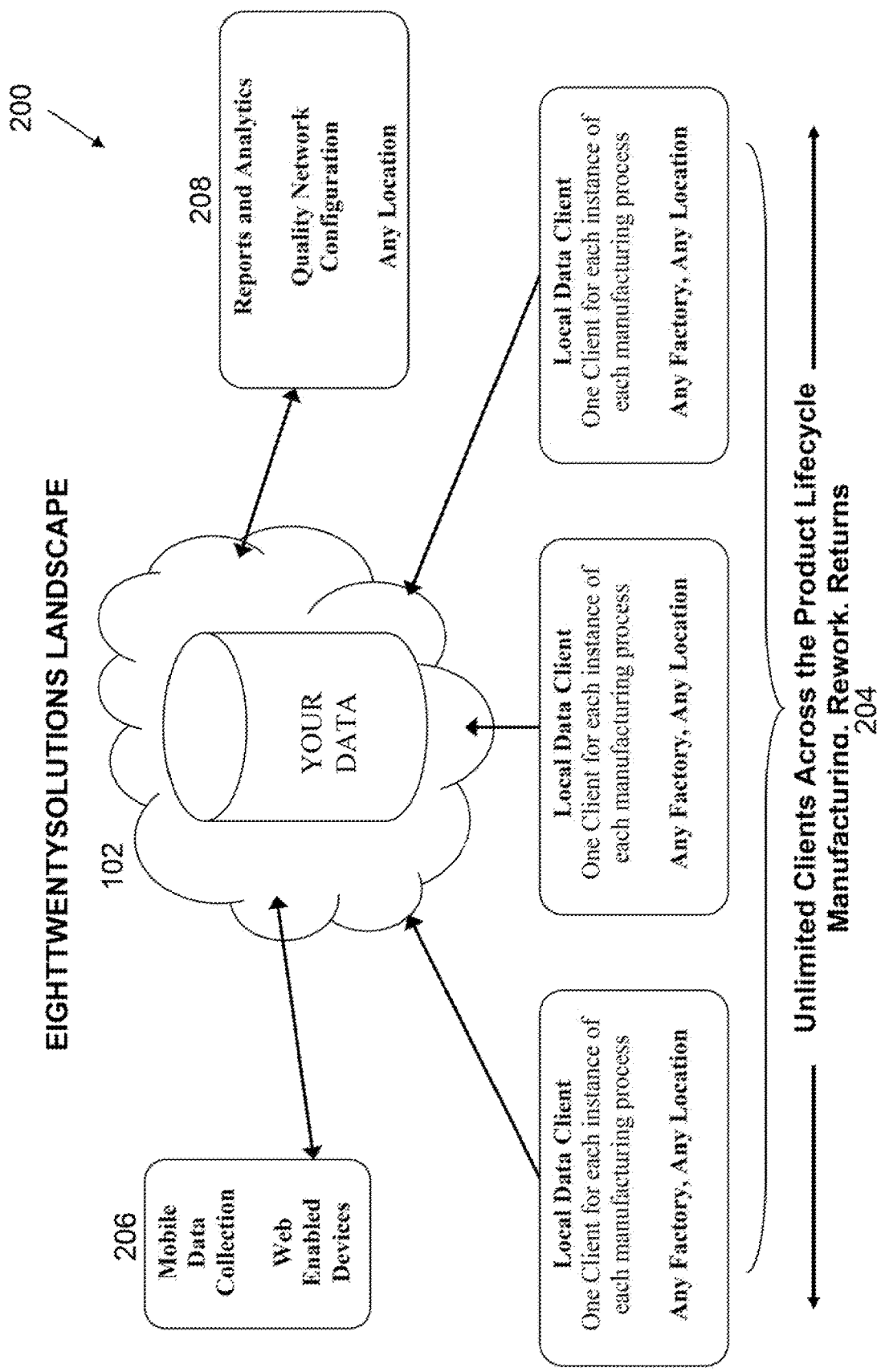
FIG. 2 illustrates the breadth of the manufacturing data collection system, according to embodiments of the invention.

FIG. 2 illustrates, at 200, the breadth of the manufacturing data collection system, according to embodiments of the invention. With respect to FIG. 2, the breadth of the data collection system includes: any data, any factory, and any location, all of which are shown by illustration according to embodiments of the invention. 102 represents the cloud-based database described above in conjunction with FIG. 1, which is also referred to interchangeably herein as a multidimensional manufacturing route database. 206 is a mobile data collection device that is web enabled, such as for example a smart phone, a tablet, a web enabled barcode reader, etc. Device 206 can both generate data and retrieve data from data collection cloud server 102. Also shown on FIG. 2 is a representative number of local data clients 204 wherein there is one client for each instance of each manufacturing process of each multidimensional manufacturing route that transmits product data to the database 102. Also shown is reports and analytics terminal 208 for requesting quality data and retrieving the quality data results from the database 102. Note that there can be any number of clients 204 across the product lifecycle. The product lifecycle can include manufacturing results, rework results and returned product results. The data collection includes capturing the grain of the machine performing the process within a manufacturing route. Therefore, the client is the grain of the manufacturing data route. Wherein "grain" indicates the lowest piece of information in a hierarchy for the manufacturing system illustrated in the embodiments discussed herein.

In various embodiments, there can be a number of clients performing the same process. By creating a structure of manufacturing routes wherein a single client resides in one manufacturing route it is possible to isolate problems occurring within the manufacturing system to the machine (client) level. As used in this description of embodiments, machine and client are used interchangeably.

Figure 3:
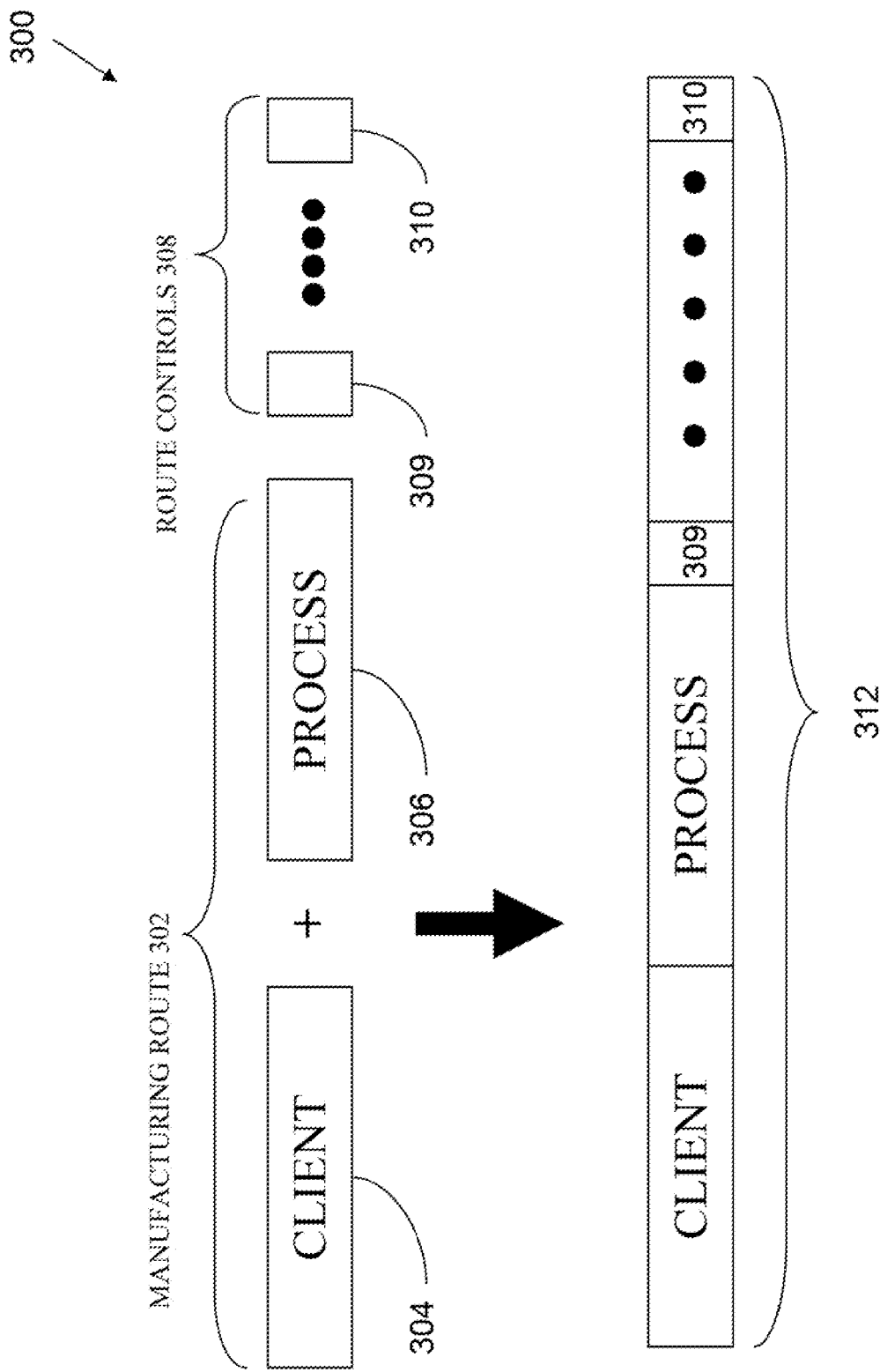
FIG. 3 illustrates a multidimensional manufacturing route, according to embodiments of the invention.

FIG. 3 illustrates, at 300, a multidimensional manufacturing route, according to embodiments of the invention. With reference to FIG. 3, a manufacturing route is illustrated at 302. The manufacturing route 302 includes a client machine 304 and a process 306 which is associated with the client machine 304. A number of manufacturing route controls 308 are indicated by control 309 through control 310. Manufacturing route controls are used within a user interface such as an application program running on a manufacturing route data processing system to permit a user to manipulate manufacturing routes. As described above, a mobile device can be configured with the manufacturing system to permit display of manufacturing routes and control of the manufacturing routes within a user interface as described more fully in conjunction with the figures below.

312 depicts an interactive multidimensional manufacturing route for use by a user to monitor the manufacturing process and to improve the value of the manufacturing process.

A database, such as 102 described above, as well as those discussed in the figures that follow, store manufacturing data by organizing the data in multidimensional manufacturing routes. Organized by the structure taught herein, a database becomes a multidimensional database. In various embodiments, the multidimensional database consists of individual tables which are referenced by "key" fields. Where the "key" is used to identify a manufacturing route. The tables contain both facts and dimensions or sub-dimensions. A sub-dimension is also referred herein as a secondary dimension.

As used in this description of embodiments, "facts" are a part of the multidimensional database. Facts are contained within a database table and can be numeric measurements (values) that are the result of collecting data relating to one or more dimensions of a manufacturing route.

As used in this description of embodiments, "dimensions" are a part of the multidimensional database and are represented by an entry and or a portion of a database table. Dimensions can be hierarchical in nature and the "grain" of the dimension is the highest level of precision for which data is being collected for.

As used in this description of embodiments, a "manufacturing route" maps a machine to the database and contains at least one dimensional key allowing the data collected by the machine to be entered into each dimension and fact table. A manufacturing route represents a machine construct but also includes a schema definition of the associated process and related product and business. At a minimum a manufacturing route contains as dimensions a machine and the process associated with the machine. However, many other attributes (or additional dimensions) of the manufacturing route dimension are possible, all of which relate to the machine through which the data is driven. Such as for example, the machine's physical location, which process the machine is collecting data for, and for which product name and for which business the data is related to. The foregoing is not an exclusive list and is not meant to limit embodiments of the invention. A multidimensional manufacturing route can have a general number of dimensions according to various embodiments of the invention. A further discussion of the manufacturing route and the dimensions that pertain thereto is found below with the figures that follow including FIG. 13 as well as others.

As part of the structure of the multidimensional database, in some embodiments, a multidimensional database is configured with secondary dimensions. In such architecture, a primary dimension has a "key" field that is included in each fact table. A secondary dimension is a dimension which does not appear in every table that contains the "key" field. Therefore, the secondary dimensions will show-up in some fact tables that contain a given key field and not in other fact tables that contain the given key field. In one or more embodiments, an example of a primary dimension is time, and examples of a secondary dimension is a product, where the product secondary dimension is included at least in the product fact table but not in every fact table in the database associated with the given key field. The product secondary dimension can have attributes such as for example: serial number, work order, part number, parent serial number, status, etc.

Figure 4:
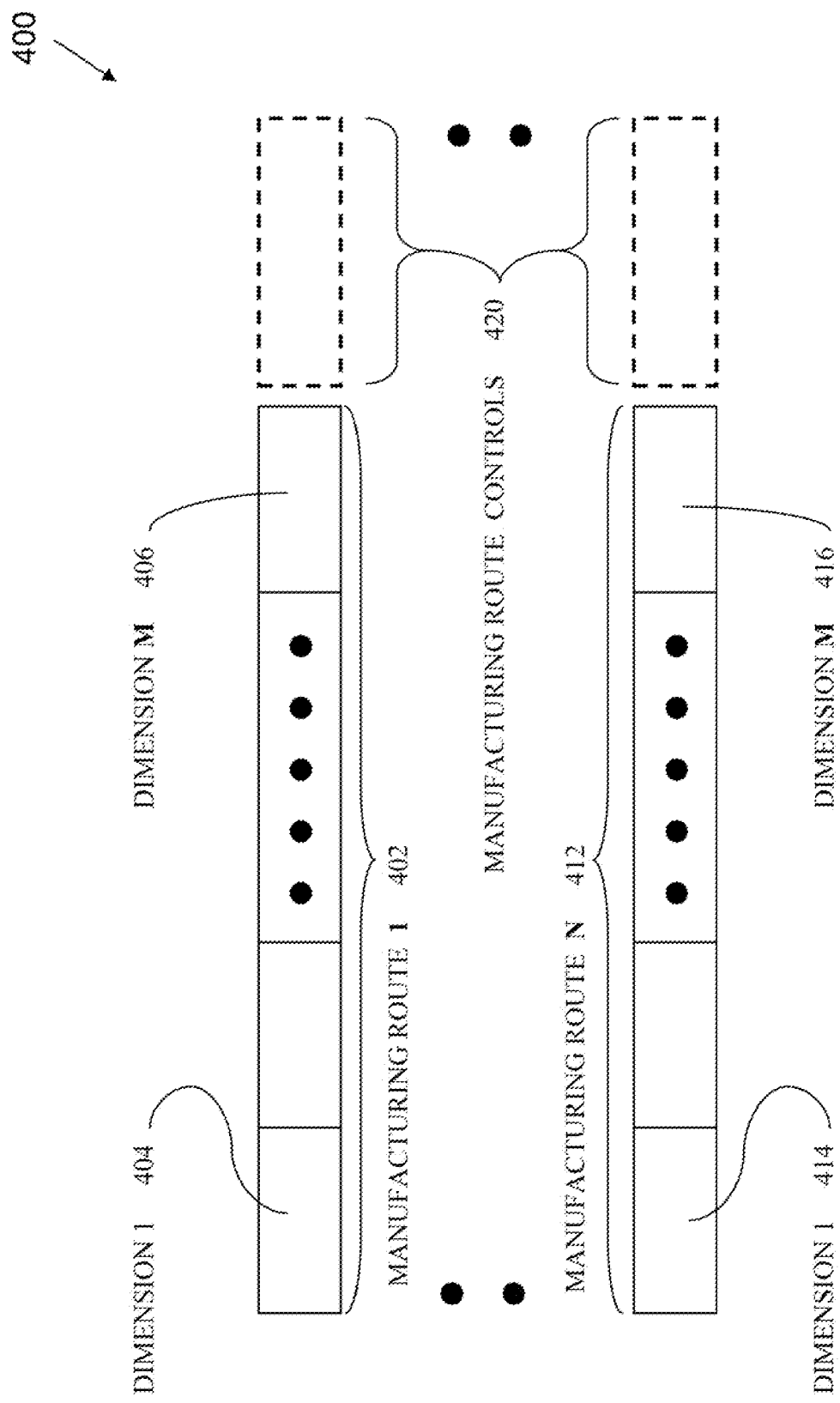
FIG. 4 illustrates a multidimensional manufacturing route structure, according to embodiments of the invention.

FIG. 4 illustrates, generally at 400, a multidimensional manufacturing route structure, according to embodiments of the invention. With reference to FIG. 4, a multidimensional; route structure includes a plurality of multidimensional manufacturing routes. A first multidimensional manufacturing route is illustrated at 402. The multidimensional route structure 402 includes a first dimension 404 and up to a general number "M" of dimensions indicated by 406. A general number of multidimensional manufacturing routes "N" is illustrated at 412. The multidimensional route structure 412 includes a first dimension 414 and up to a general number of dimensions "M" indicated by 416. Optionally, a number of route controls 420 are provided for each of the multidimensional manufacturing routes within the multidimensional route structure illustrated in 400.

A multidimensional manufacturing route structure is a group of routes which are logically related to a given product manufacture. This group of multidimensional manufacturing routes is typically presented to a customer (user) as an array of multidimensional manufacturing routes arranged in a table that pertain to the manufacture of a given product. "Time," elapses as the manufacturing proceeds. The order that the processes occur in the manufacture of a product (and therefore the evolution of time) is implied by the arrangement of the multidimensional manufacturing routes in the multidimensional manufacturing route structure with increasing time implied by increasing route row index.

As used in this description of embodiments, "data" consists of the dimensions and facts that are collected during the manufacture of a product. These can include variables which are numeric, attributes which are non-numeric, and symptoms which indicate progression towards failure.

Figure 5:
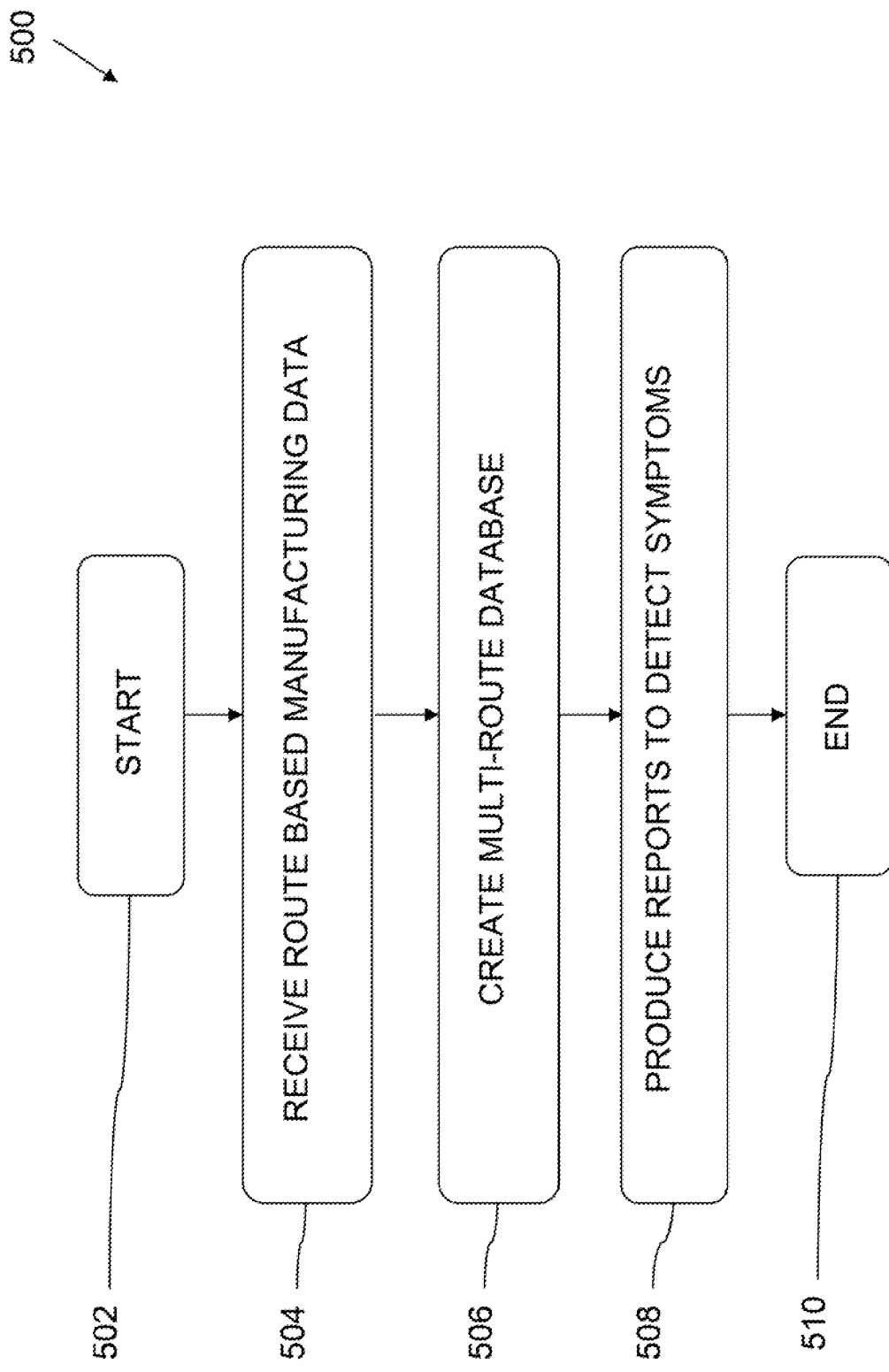
FIG. 5 illustrates using multidimensional manufacturing route data to improve value during manufacturing, according to embodiments of the invention.

FIG. 5 illustrates, generally at 500, using multidimensional manufacturing route data to improve value during manufacturing, according to embodiments of the invention. With reference to FIG. 5, a system process begins at a block 502. At a block 504 multidimensional manufacturing route data is received by a database such as those described herein. At a block 506 the manufacturing system stores the data received at the block 504 into the dimensional manufacturing database. At the block 508 data is retrieved from the database and one or more reports are generated. The reports provide insight into the evolution of the product through the manufacturing system. Symptoms are detected when one or more variables, which are being monitored within a manufacturing route, start to trend in a direction which will exceed process limits. Based on symptoms, corrective action is taken within the manufacturing system to prevent product waste. Preventing product waste increases the efficiency of the manufacturing system and increases the value of the manufacturing system.

Figure 6:
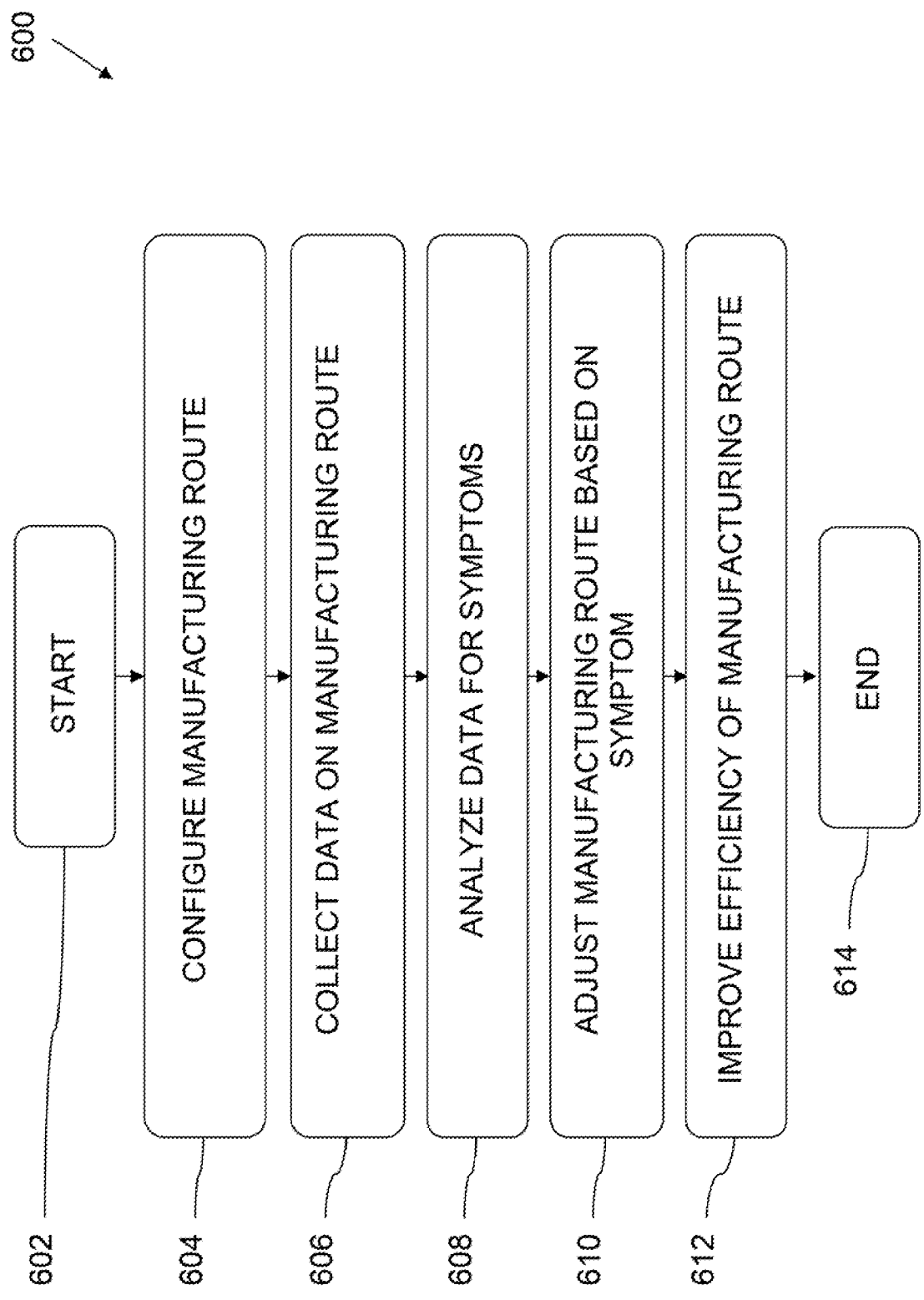
FIG. 6 illustrates using multidimensional manufacturing route data to improve efficiency during manufacturing, according to embodiments of the invention.

FIG. 6 illustrates, generally at 600, using multidimensional manufacturing route data to improve efficiency during manufacturing, according to embodiments of the invention. With reference to FIG. 6, a manufacturing system analysis begins at a block 602. At a block 604 a manufacturing route is configured by a user using a user interface and analysis tools as described herein both in the figures above and below in conjunction with the figures that follow such as FIG. 16. This process of configuring manufacturing routes in block 604 can be repeated as often as is needed to configure a structure of manufacturing routes for the manufacturing system. At a block 606 data is collected on the manufacturing route(s) configured in the block 604. At a block 608, variables controllers are used to analyze data for symptoms. At block 610 the manufacturing route is adjusted in light of the symptom discovered in the block 608. At block 612 the efficiency of the manufacturing route adjusted in the block 610 is improved. The manufacturing system analysis ends at a block 614.

Figure 7:
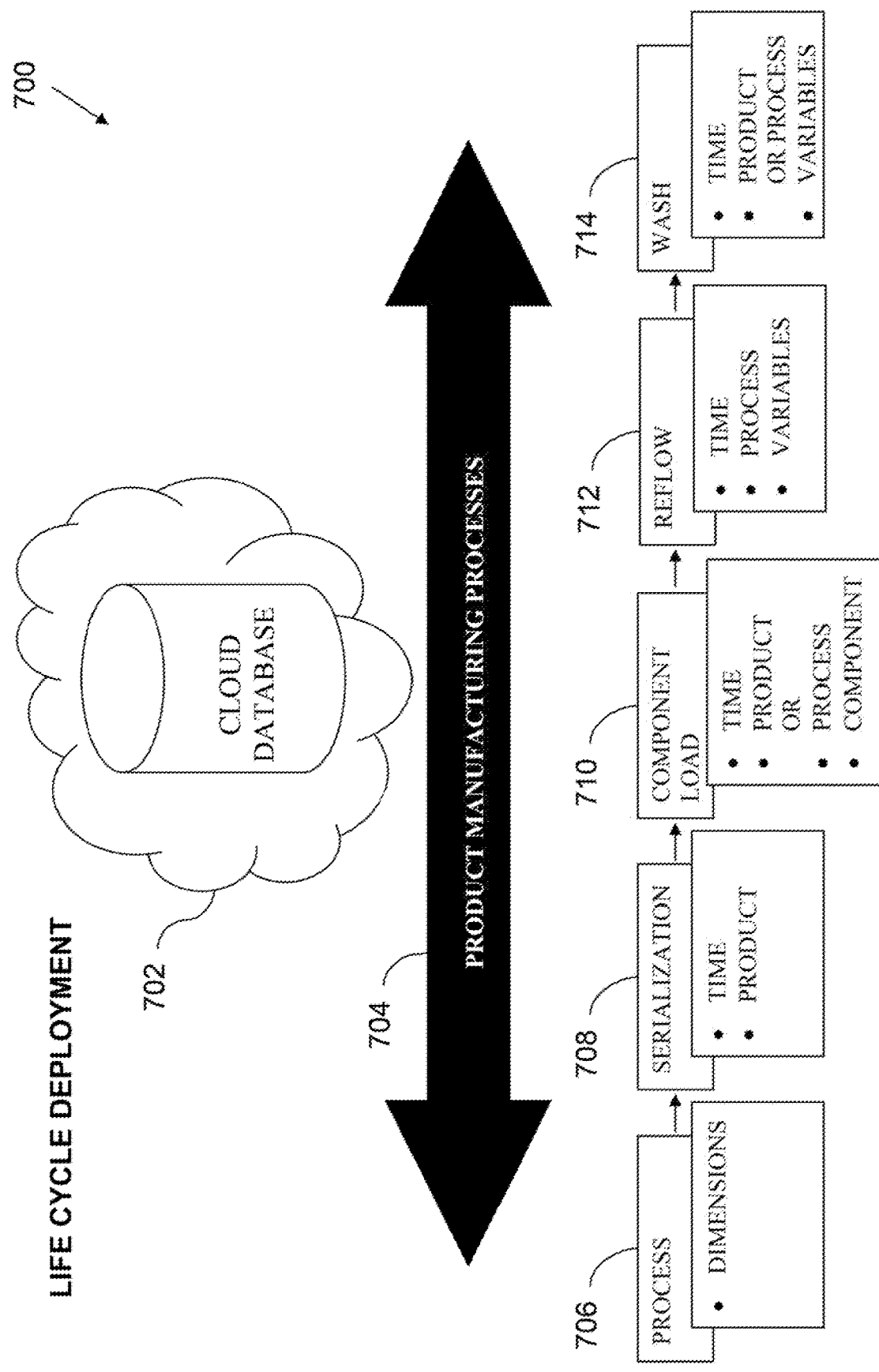
FIG. 7 illustrates capturing data across many processes within the manufacturing system, according to embodiments of the invention.

FIG. 7 illustrates, generally at 700, capturing data across many processes within the manufacturing system, according to embodiments of the invention. FIG. 7 illustrates an example of the system's ability to capture data during an entire manufacturing process. A dimensional manufacturing database 702, described above, is configured to accept data from a variety of manufacturing processes 704 that occur during a product lifecycle. In one or more embodiments, a manufacturing process 706 may start with the process dimensions that include the name of the process and the process parameters that need to be captured. Following this construct at 708, the time the process starts is noted and the particular product is given a serialization number. In this example, the grain of the time variable is the precision which time is collected at. In one or more embodiments, a non-limiting example of the grain of time is 0.001 seconds. The grain of the product is the serial number.

At 710, the next step again includes as dimensions the time, again the particular product or process and now also includes the component parts used in the assembly. Attributes of the components are captured such as when they were made. Also referred to as lot code and date code. This allows for traceability of a component in an assembly. For example, if it is determined that a failure occurred with a component it is possible through reports on the collected data to determine which units of the assembly are defective. Corrective action can then be taken such as component recalled, replacement, adjustment, etc. In this way, the value of the manufacturing process is improved by minimizing waste through defective component and assemblies.

At 712, the fourth step, in the case of an example using a printed circuit board, the process is "reflow," with dimensions which include time, the reflow parameters used, and any variables that may exist. Here variables are for example in some embodiments, how hot was the oven (temperature) and what temperature was the part at and for how long? Collecting data such as this enables decisions to be made that can be corrective action to fix problems that arise in a given process.

At 714, the fifth step, following the example of printed circuit board manufacture, as is typical in printed circuit assembly, is the process of the wash step. Here again dimensions can include time, the product or process is delineated, and any variables are logged. All this information collected from the client machines at any location throughout the global landscape is collected and is securely logged into the cloud database 702.

Additionally, the manufacturing lifecycle can be tied together with the life cycle in the field to provide a full feedback cycle which drives manufacturing changes based data collected during the service life of the product. This is described more fully below in conjunction with FIG. 11.

Figure 8:
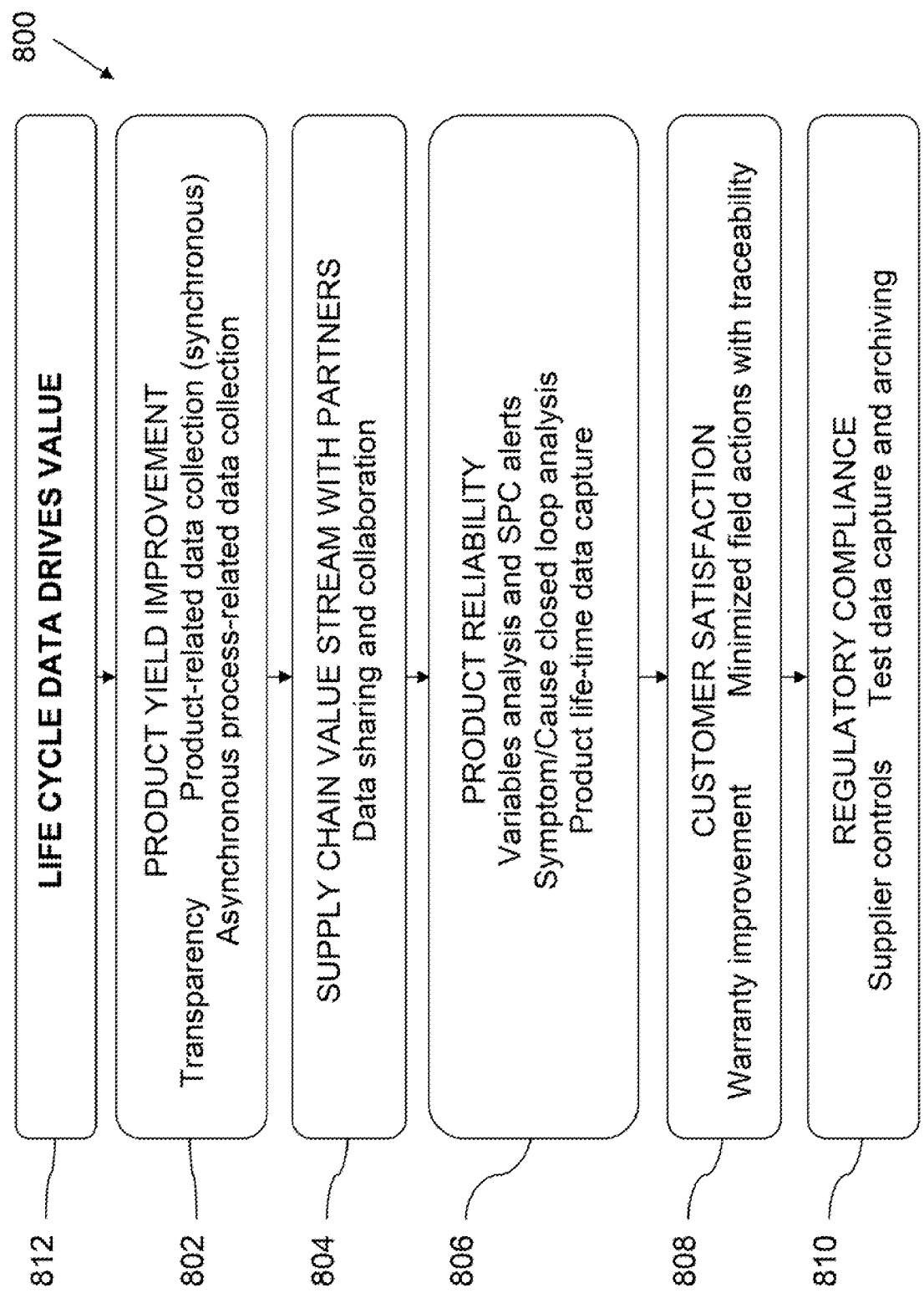
FIG. 8 illustrates data collection during product lifecycle enhancing the value of the product, according to embodiments of the invention.

FIG. 8 illustrates, generally at 800, data collection during product life cycle, thereby enhancing the value of the product, according to embodiments of the invention. FIG. 8 illustrates how data collected during the life cycle of a product enhances a product's value. At a block 802 product yield improvement increases product value. Product yield improvement is transparent to the user of the data. The data collection can occur in real time or the process related data can be viewed at a later date.

At a block 804 the product or process data can be shared with the supply chain partners. Partners can be machines (clients) located anywhere in the world that participate in the manufacturing system according to embodiments of the invention described herein. For example, a partner can be a client in a multidimensional manufacturing route that contributes to a structure of routes in the manufacturing system. Some non-limiting examples are for instance a source of a physical ingredient that is produced with a number of client machines in one geographic location. In a separate geographic location and one or more client machines contribute to another aspect of the manufacture of the product. Data is collected on this group of one or more client machines in the separate geographic location. Each client machine is configured as a separate manufacturing route and data is collected on the manufacturing routes within the description of embodiments taught herein. In this manner, collaboration between clients is accomplished with the data being collected and stored in a common dimensional manufacturing database organized as a structure of multidimensional manufacturing routes.

At a block 806 product reliability increases a product's value. Variable analysis and Statistical Process Control (SPC) parameters can be monitored for compliance to pre-established goals. Symptom and cause analysis can be performed to correct any abnormalities. Symptoms are collected and are displayed via reports. A cause can be added in light of the symptoms collected. The product can be followed throughout its usable life to capture its reliability parameters. During the life of the product, data can be collected from the product while used in the field and sent back to the dimensional manufacturing database. This data can be used to adjust the manufacturing system to extend the useful life of the product in the field by changing the way the manufacturing proceeds. In one non-limiting example, given merely for illustration, in one or more embodiments, when a bearing failure rate exceeds an expected value this failure data can be used to select a bearing with a greater lifespan so that the product's useful lifetime is extended.

In some applications, embodiments of the invention are used exclusively to collect data from the product in the field. This data can be used to adjust the performance of the product in the field. All of which drive product value and increase the efficiency of a manufacturing system.

At a block 808 customer satisfaction drives product value. Customer satisfaction is improved and fewer warranty claims need to be processed as the product reliability improves due to closer monitoring of the manufacturing process. Field actions are minimized and tracking field actions is improved.

At a block 810 better regulatory compliance increases product value. Regulatory compliance and reporting mechanisms are easier to track and respond to. Most failures in electronics originate at the supplier, and better monitoring and closed-loop symptom/cause understanding can catch the failure mechanism before it's shipped to a customer. Test data is easily captured and archived by retaining that data in the cloud. Companies that provide cloud data storing have strong backup protocols and advertise 100% reliability.

Applications of embodiments of the invention can be used to monitor the quality of medical devices which supports a company's ability to conform to applicable regulations. For example, data collection form the supply chains can be used to ensure that what is delivered is actually what was ordered. By implementing the data collection in a multidimensional manufacturing route data structure the resulting data can be analyzed and problems with individual suppliers can be identified.

FIG. 9A-9B illustrates, generally at 900, an example of data reporting, according to embodiments of the invention. With reference to FIG. 9A-9B, an example of the yield chart of a Surface Mount Technology (SMT) electronic assembly board is illustrated. The column 950 shows the processes (and machines that perform the process) the boards undergo as the boards progress through a manufacturing system. The other columns (952, 954, 956, 958, 960) show the number of boards tested and the test yields for particular work orders (on a weekly basis), the work order is the particular batch being assembled and tested. Column 962 shows the total units tested through the aggregate period represented by column 952 through 960. Column 964 shows the total yield associated with column 962.

The yield chart is organized with rows, where each row with bold type (e.g. 902, 906, 910, 914, 918, 922, 926, 930, 934, 938 942, 946, and 950) represent the processes performed. The rows directly beneath each bold typed row indicate the client machines that performed the process indicated by the bold typed row directly above. For example, row 902 indicates the process of Environmental Stress Screening (ESS). Rows 904 indicate the machines that perform the ESS process. For example, ESS No 2, Ess No 3, ESS No 5 are three machines that perform the ESS process. The yields for each of the machines indicated in 904 are shown under column 954 for the second week of 2012. The yield on ESS No 2 is 98.8%, the yield on ESS No 3 is 100%, and the yield on ESS No 5 is 100%. Thus, the lower yield on ESS No 2 (98.8%) indicates that the overall manufacturing system yield is being reduced by ESS No 2. Thus, further investigation of the ESS No 2 machine is warranted based on the information provided in the yield chart of FIG. 9A-9B.

Note that the information provided in the yield chart represents another view of the multidimensional manufacturing routes described previously in conjunction with the figures above. For example, a multidimensional manufacturing route has dimensions of machine (client) and the process performed by the machine. Thus, each row of the ESS process, i.e., ESS No 2, ESS No 3, and ESS No 5 represent three different multidimensional manufacturing routes.

Similarly bold row 906 indicates the process of Final-Test and the rows indicated by 908 indicate that there are two machines, i.e., Final_Test1, and Final_Test2 performing the process of final test. Thus, each row of the Final-Test process, i.e., Final_Test1, and Final_Test2 represent two different multidimensional manufacturing routes.

Bold row 910 indicates the process of Hand Solder and the row 912 directly below indicate the client HS Station 1 that performs the process of Hand Solder. The row HS Station 1 represents a multidimensional manufacturing route.

Similarly, for the rest of the rows in the yield chart of 900 the bold row 914 indicates the process. In Circuit Test (ICT) and the rows directly beneath, i.e., 916 represent the machines that perform the ICT process. Bold row 918 indicates the process ORT and the row directly beneath, i.e., 920 indicates the machine that performs the process ORT. Bold row 922 indicates the process Rework and the row directly beneath, i.e., 924 indicates the machine that performs the process Rework. Bold row 926 indicates the process Serialization and the row directly beneath, i.e., 928 indicates the machine that performs the process Serialization. Bold row 930 indicates the process Ship and the row directly beneath, i.e., 932 indicates the client that performs the process Ship, Bold row 934 indicates the process SMT-Line1 and the row directly beneath, i.e., 936 indicates the machine that performs the process SMT-Line1. Bold row 938 indicates the process SMT-Line1 and the row directly beneath, i.e., 940 indicates the machine that performs the process SMT-Line1. Bold row 942 indicates the process Wash and the row directly beneath, i.e., 944 indicates the machine that performs the process Wash. Bold row 946 indicates the process Wash-Bottom and the row directly beneath, i.e., 948 indicates the machine that performs the process Wash-Bottom. Bold row 950 indicates the process Wash-Top and the row directly beneath, i.e., 952 indicates the machine that performs the process Wash-Top.

Figure 10:
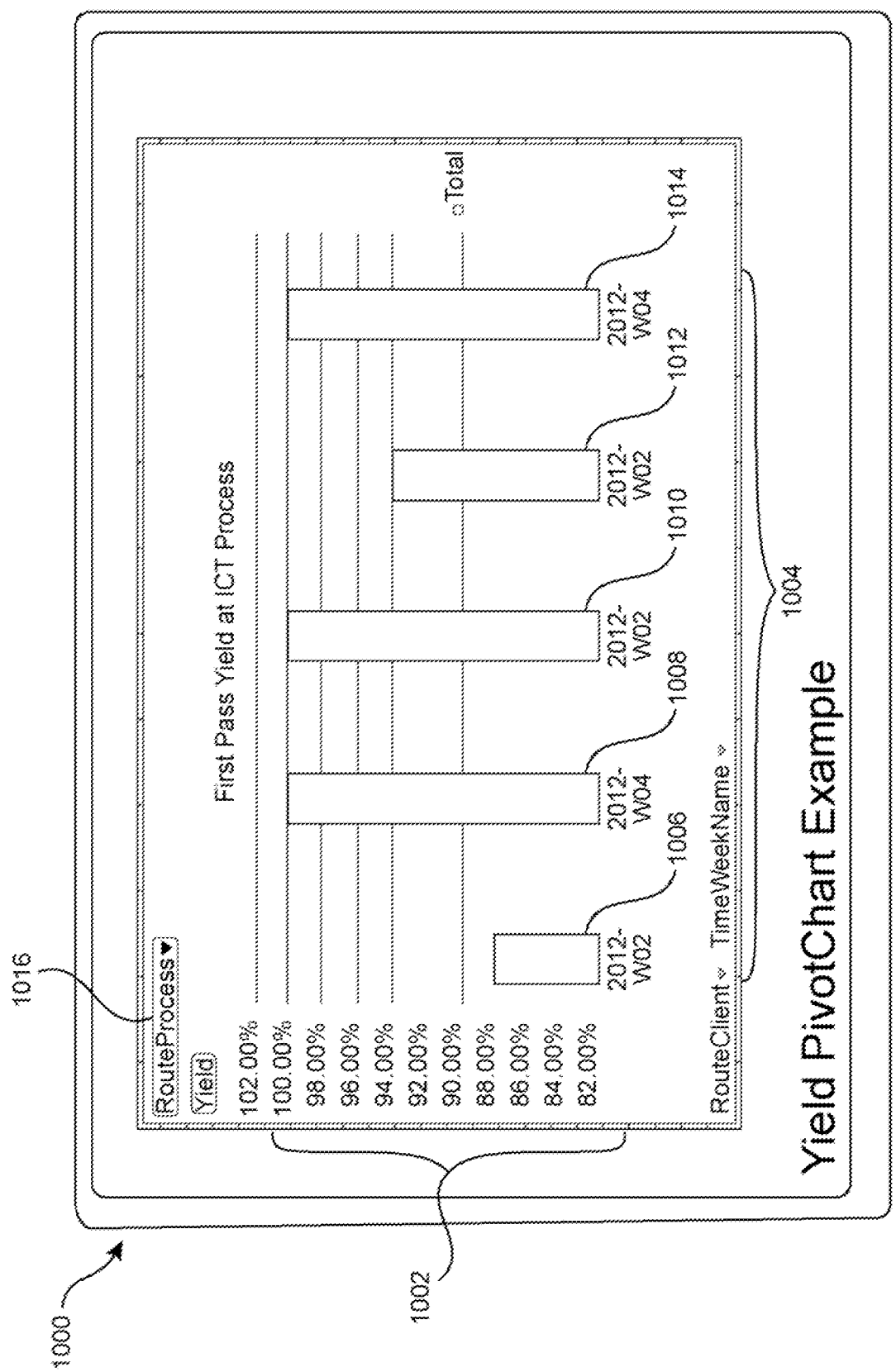
FIG. 10 illustrates an example of data reporting associated with the data shown in FIG. 9A-9B, according to embodiments of the invention.

FIG. 10 illustrates, generally at 1000, an example of data reporting associated with the data shown in FIG. 9A-9B, according to embodiments of the invention. With reference to FIG. 10, a pivotchart example of the yield chart of FIG. 9A-9B (ICT Process 914 and machines 916) is illustrated. The Y axis 1002 is the yield in percentages for the ICT Process and the X axis shows which work order was tested at 1004, essentially illustrating yield achieved by the multidimensional manufacturing routes which perform the ICT Process. Note that "Route Process" has been selected as indicated at 1016.

The pivotchart of FIG. 10 is implemented as part of a user interface which runs on a manufacturing data processing system as described above in conjunction with some of the previous figures. e.g., FIG. 1. From the data presented in FIG. 10, the yield obtained from machine ICT1 and ICT3 in week 2 of 2012 (2012-W02) deviates from the yield obtained from machine ICT2. This situation invites further exploration of why the yield is low on two manufacturing routes during a common time period. Resolution of the problem will enable the yield to be maintained in future production runs thereby increasing yield and efficiency for the manufacturing system.

In light of the reduced yield illustrated in FIGS. 9A-9B and FIG. 10 for the ICT Process, a Variables Controller Tool and a Components Controller Tool can be used to drill down into the data collected by the multidimensional manufacturing route data collection and analysis system. The Variables Controller Tool and Components Controller Tools are implemented in various embodiments with user interfaces and are part of the manufacturing data processing system as described above in conjunction with some of the previous figures. e.g., FIG. 1. For example, analysis of the failed units examines how they were made and what was going on at the time of manufacture. The multidimensional manufacturing route data collection and analysis system captures test information collected in the manufacturing routes and in particular the data collected during the time period when the yield was low permits discovery of the problem that caused the low yield. In one non-limiting hypothetical example given merely for illustration, low yield might be traced to a certain resistor being out of specification. Then use of the Components Controller permits discovery of where the resistors came from that were used during week 2 of 2012. For example, which lot code did the resistors come out of? Thus, rectification of the problem could be traced to a particular sub-dimension in the manufacturing route of 912/914 (FIGS. 9A-9B) and 1006/1012 (FIG. 10). The sub-dimension containing data on the source of the resistors. Alternatively, depending on how the manufacturing routes are constructed, the source of the resistors could be configured as client machines having their own manufacturing routes. In either scenario, if the problem is resident with the particular resistors, then rectification of the problem occurs when that source of parts is adjusted in the manufacturing system.

FIG. 11 illustrates, generally at 1100, an example of variables aggregation, according to embodiments of the invention. With reference to FIG. 11, data is collected for a variable and is compared against upper and lower control limits and against upper and lower specification limits.

A variable C175 shown in column 1102 represents a capacitor. The units corresponding with measurement of the variable are shown at 1004 with an "F" representing a unit of capacitance, i.e., "farads." The data collected from capacitor C175 is tabulated at 1110. A lower control limit and an upper control limit are given by 1108 and 1112 respectively. Likewise a lower specification limit and an upper specification limit are given by 1106 and 1114 respectively. Column 1116 indicates variable status with a "1" indicating valid status and a "0" indicating invalid status. Column 1118 is the failure indicator for the lower speciation limit, column 1124 is the failure indicator for the upper specification limit, column 1120 is the failure indicator for the lower control limit, column 1122 is the failure indicator for the upper control limit.

In operation, measurements are made on capacitor C175 indicated by the values in the rows of column 1110. The value in 1110 is compared against the upper and lower control limits and the upper and lower specification limits. When a measured value exceeds a control limit or a specification limit a "1" is recorded in the appropriate column 1116 through 1124 to indicate the failure. In the example of FIG. 11, the "1" in column 1122 indicates that the value for capacitor C175 (2.33109E-06) exceeded the upper control limit of (2.29658E-06). Events such as described, result in a report being sent to the customer and then an action is taken to change the manufacturing system therefore increasing yield, value and or efficiency of the manufacturing system for a product.

The variables controller described in FIG. 11 can be applied to many different variables within a route structure of a manufacturing system to improve the yield of one or more products within a given manufacturing system.

Figure 12A:
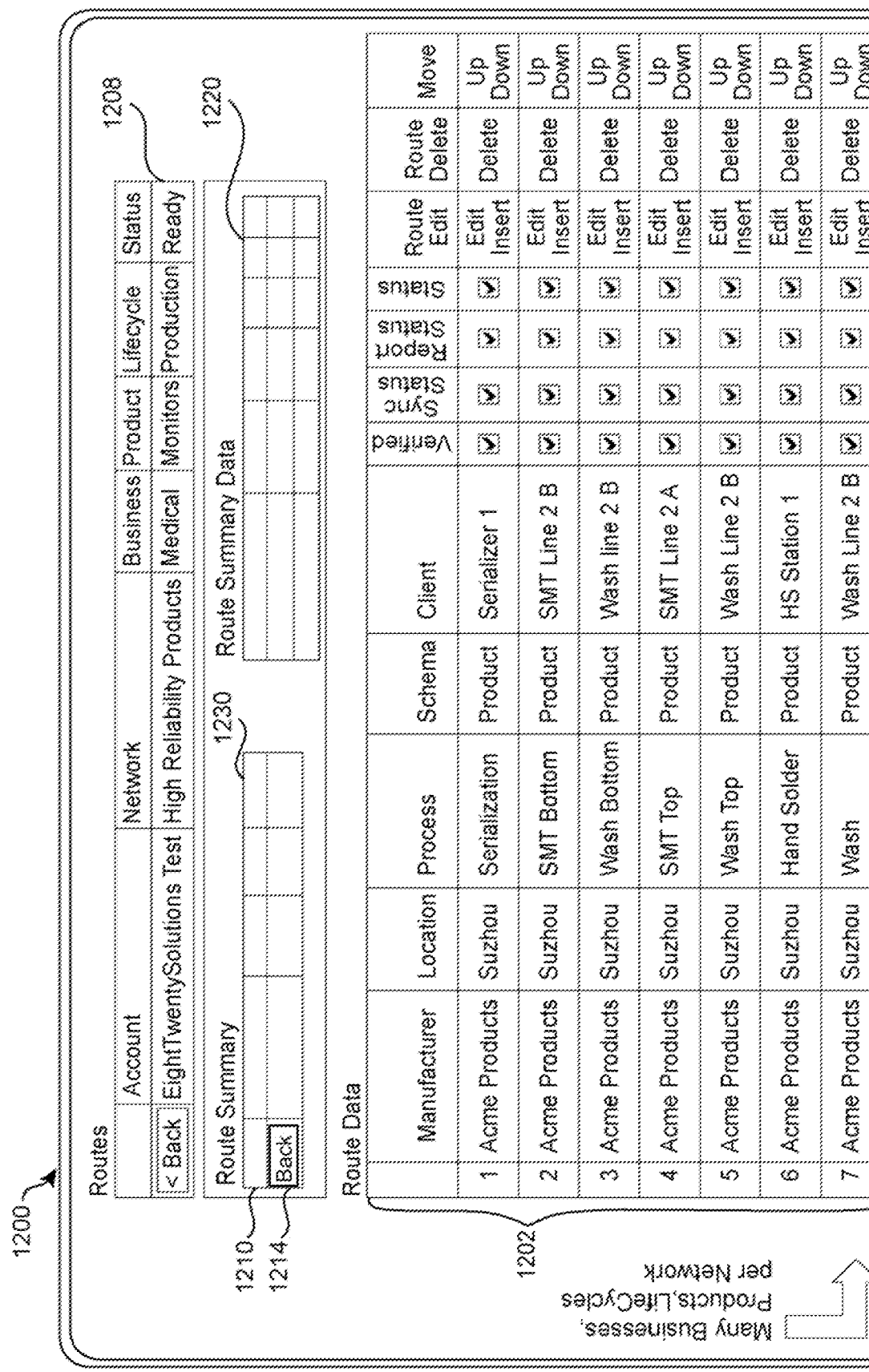

FIGS. 12A-12A1 illustrate, generally at 1200, creating manufacturing data routes, according to embodiments of the invention. With reference to FIGS. 12A-12A1, the mapping of the machine to the process, product, and business is illustrated to create data routes. The network of data routes is selected with the tool 1208. The data routes corresponding to the selected network from 1208 are represented by the rows 1202. The dimensions of the data routes 1202 are represented by the columns 1204.

1206 represents controls for each of the routes of 1202. In one non-limiting example used only for illustration, within the route controls of 1206 are a number of route controls. In other embodiments, other controls are provided. In the example of 1206, "Verified" indicates whether a client machine has sent data to the route. "Sync Status" is a control which indicates whether data should be collected (synchronized with the route in the database) on an on-going basis. "Report Status" is a control which indicates whether the route should be included in reports. "Status" indicates whether the route should be enabled at all. "Edit" permits any of the dimensions 1204 of the route to be edited. The route can be "Deleted" a new route can be "Inserted" or an existing route can be "Moved." All of these route manipulations functions can be accomplished with the controls 1206. Thus, a structure of data routes is illustrated in the user interface of 1200 for a network of a manufacturing system.

Blocks 1230 and 1220 on the left illustrate the expandability of the manufacturing system database and analysis tool. Block 1230 shows the Account Holder. The block 1220 contains Route Summary Data for multiple products. "Route Summary Data" has two products shown, one at 1210 an Automotive product with 16 different routes. A second product shown in 1220 is a medical product 1214 with 18 routes.

FIG. 12B illustrates, generally at 1250, a structure of manufacturing data routes, according to embodiments of the invention. With reference to FIG. 12B, a user interface includes selector 1280 which permits the routes associated with a given Account, Network, Business, and Product to be selected. At 1282 Route Data is selected for view directly below.

The routes are represented by the rows 1252, which are numbered 1 through 8 in this example used for illustration only. There can be any number of routes 1252 in other embodiments. The dimensions of the routes 1252 are indicated by the columns 1254. A dimension 1268 is the client. Another dimension 1260 is the process associated with the client. Other optional dimensions include Sehema 1262, Manufacturer 1264, and Location 1266. In other embodiments, additional dimensions and sub-dimensions can be configured with a route. Those dimensions shown in FIG. 12B are provided merely for illustration and do not limit embodiments of the invention. Controls 1270 are provided to act on the routes 1252 and provide functionality as discussed above in conjunction with FIGS. 12A-12A1.

The collection of routes provided in FIG. 12B is referred to herein as a route structure as previously described. In some embodiments, the evolution of time is captured by the order of the routes such that increasing time is represented by increasing route number 1 through 8. Meaning that route 1 occurs first in time then route 2, etc. Note that the seventh route collects data during the product's life in the field and the last route, number 8, is a refurbishment process. Thus, in some embodiments, a complete product lifecycle is constructed of which that shown in FIG. 12B is but one example.

Figure 13:
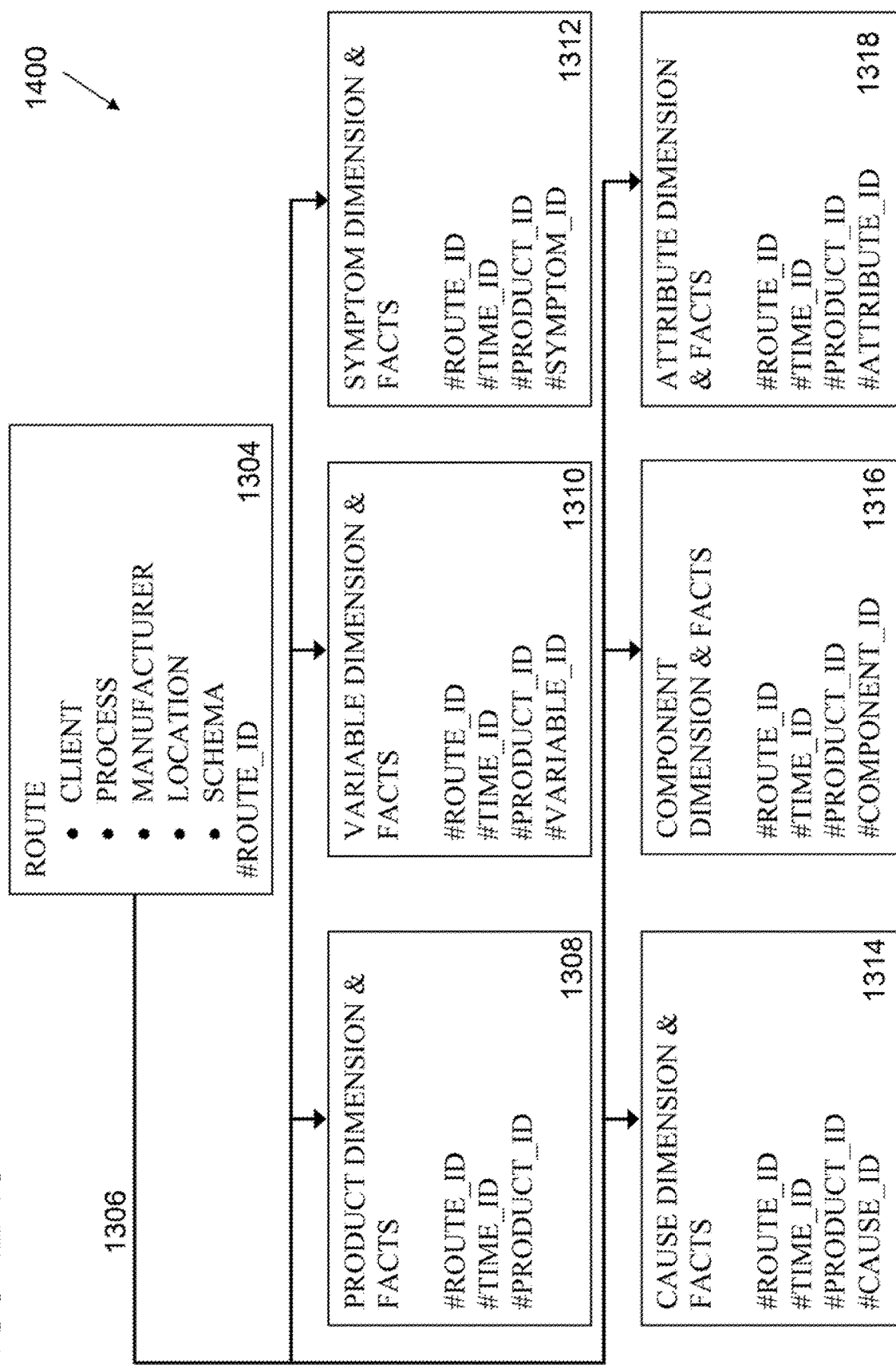
FIG. 13 illustrates a multidimensional manufacturing route, according to embodiments of the invention.

FIG. 13 illustrates, generally at 1300, a multidimensional manufacturing route, according to embodiments of the invention. With reference to FIG. 13, a manufacturing route is represented by 1304 and the definitions of the dimensions for the data that is collected is illustrated with boxes 1308, 1310, 1312, 1314, 1316, and 1318. In box 1304, the manufacturing route is identified with a unique route "key" indicated by "#Route_ID." The manufacturing route can have dimensions of Client, Process, Manufacture, Location, and Schema (note that as described above only two dimensions need be associated with a given manufacturing route and those are Client and Process.

1306 illustrates the connectivity of dimensions and facts that can be associated with a given manufacturing route 1304 in a multidimensional manufacturing route database. 1308 represents the "Product Dimension" and "Product Facts" and provides a definition for these which is also reflected in the Schema shown in Appendix A. 1308 is realized with one or more tables in the multidimensional manufacturing route database. The keys of "#Route_ID," "#Time_ID," and "#Product_ID" are used in the tables for the Product Dimension 1308.

1310 represents the "Variable Dimension" and "Variable Facts" and provides a definition for these which is also reflected in the Schema shown in Appendix A. 1310 is realized with one or more tables in the multidimensional manufacturing route database. The keys of "#Route_ID," "#Time_ID," "#Product_ID," and "#Variable_ID" are used in the tables for the Variable Dimension 1310.

1312 represents the "Symptom Dimension" and "Symptom Facts" and provides a definition for these which is also reflected in the Schema shown in Appendix A. 1312 is realized with one or more tables in the multidimensional manufacturing route database. The keys of "#Route_ID," "#Time_ID," "#Product_ID," and "#Symptom_ID" are used in the tables for the Symptom Dimension 1312.

1314 represents the "Cause Dimension" and "Cause Facts" and provides a definition for these which is also reflected in the Schema shown in Appendix A. 1314 is realized with one or more tables in the multidimensional manufacturing route database. The keys of "#Route_ID," "#Time_ID," "#Product_ID," and "#Cause_ID" are used in the tables for the Cause Dimension 1314.

1316 represents the "Component Dimension" and "Component Facts" and provides a definition for these which is also reflected in the Schema shown in Appendix A. 1316 is realized with one or more tables in the multidimensional manufacturing route database. The keys of "#Route_ID," "#Time_ID," "#Product_ID," and "#Component_ID" are used in the tables for the Component Dimension 1316.

1318 represents the "Attribute Dimension" and "Attribute Facts" and provides a definition for these which is also reflected in the Schema shown in Appendix A. 1318 is realized with one or more tables in the multidimensional manufacturing route database. The keys of "#Route_ID," "#Time_ID," "#Product_ID," and "#Variable ID" are used in the tables for the Attribute Dimension 1318.

Note that there can be a plurality of Products, Variables, Symptoms, Causes, Components, and Attributes within a given structure of manufacturing routes that is used to define a manufacturing system.

In operation, when data is collect from the manufacturing system it is separated into fact tables according to the Schema presented in FIG. 13 and as shown in Appendix A. Variables are used for numeric data and attributes are used for non-numeric data. Symptoms as described above are an indication of a defect. Component facts include a list of all of the components which are part of an assembly. Component facts can include lot code and date code that correspond to when the component was manufactured. These facts are important facts which are used for improving the reliability of a product. These facts are collected and mined during data reporting to produce reports which are presented to a user. Transformer, as described below, is used in places throughout the manufacturing system to facilitate entry of data into the schema and ultimately into the multidimensional manufacturing route database. Cause facts can be entered by a user or cause facts can be ascertained automatically through automated analysis of the symptoms.

In one or embodiments, a manufacturing route is configured as explained above with dimensions of client and process. As shown above in some examples additional dimensions of Schema, Manufacturer, and Location are used as additional dimensions. In various embodiments, different facts are collected during data collection. A core group of facts for product improvement include Product Facts. Variable Facts, Symptom Facts, and Cause Facts. Collection of this core group of facts can be applied to analyze the manufacturing system of any product manufacture thereby increasing the value of the manufacturing system through eliminating waste, reducing failure, extending product life, etc.

Figure 14:
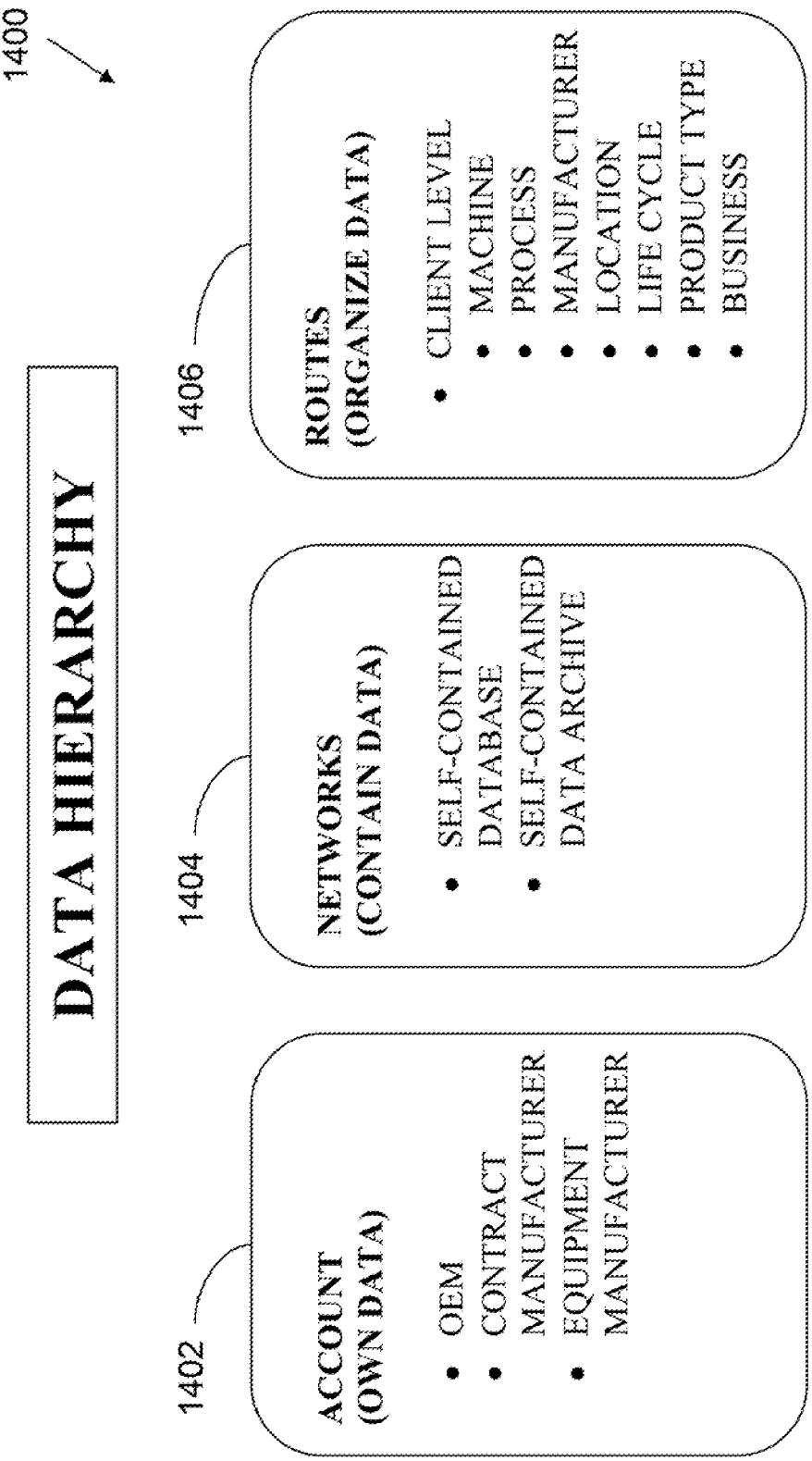
FIG. 14 illustrates an organization of the data hierarchy in a manufacturing system employing a structure of multidimensional manufacturing routes, according to embodiments of the invention.

FIG. 14 illustrates, generally at 1400, an organization of the data hierarchy in a manufacturing system employing a structure of multidimensional manufacturing routes, according to embodiments of the invention. With reference to FIG. 14, organization of a data hierarchy is illustrated. The highest data hierarchy is that of the Account Holder at 1402. The Account Holder owns the data. An Account Holder might be an Original Equipment Manufacturer (OEM), a Contract Manufacturer, or an assembly or process Equipment Manufacturer. The second tier of data hierarchy 1404 is the network (containing the data) possibly consisting of a self-contained database and a self-contained data archive. The third tier of data hierarchy 1406 is at the client level. The client level 1406 could be the machine, the process, the manufacturer, the location, the life cycle, the product type or the business providing the product or process.

One Account can have many networks and each network can have many manufacturing routes. The multidimensional manufacturing routes 1406 can be configured in various ways according to the stage of product development. For example, a structure of routes can be configured for use during prototyping of a product. Another structure of routes can be configured for product validation. Yet another structure of routes can be configured for product production. There is no limit to the number of routes that be configured into the hierarchy of 1400.

Figure 15:
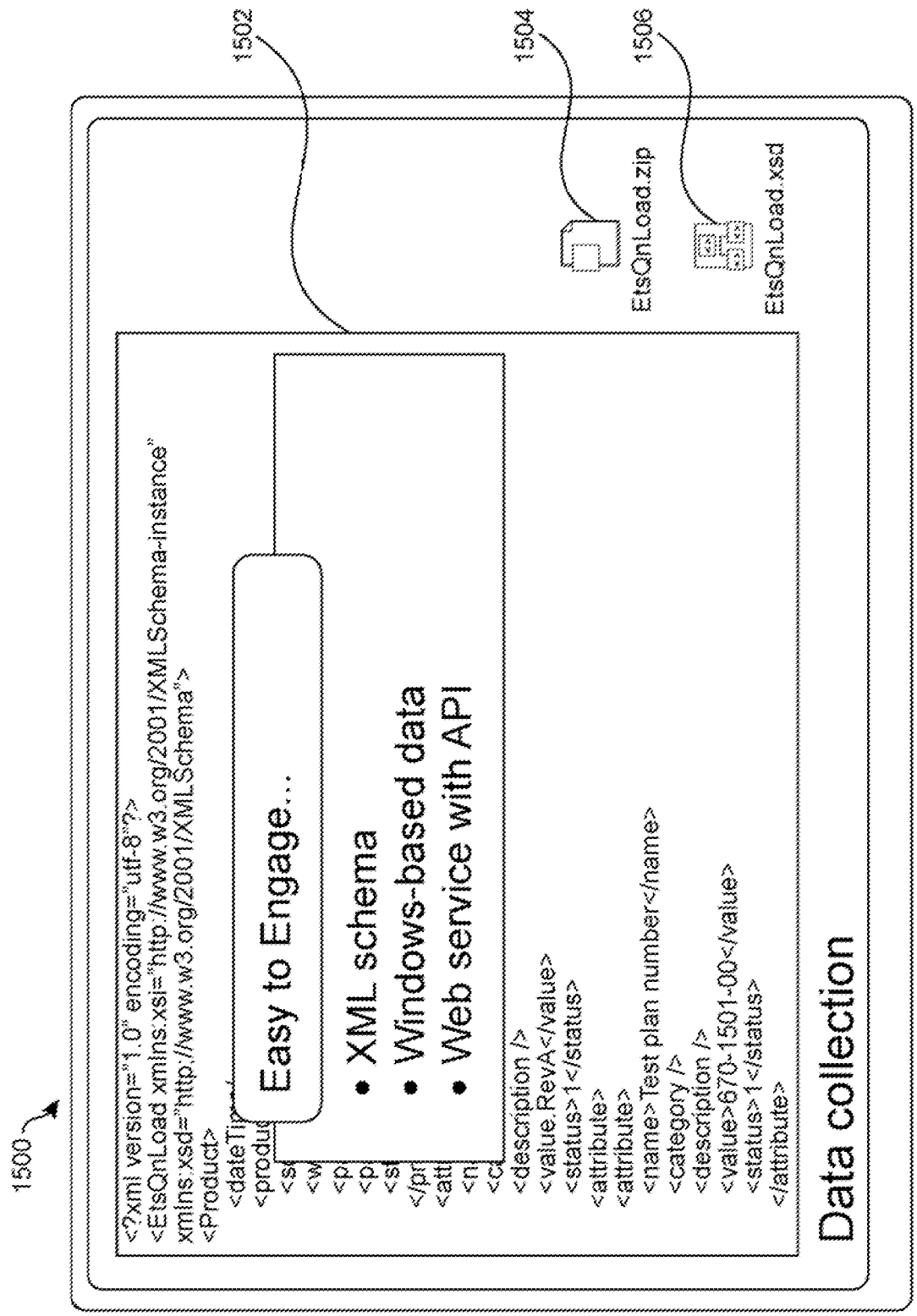
FIG. 15 illustrates methods of data collection and a data schema for a multidimensional manufacturing route structure, according to embodiments of the invention.

FIG. 15 illustrates, generally at 1500, methods of data collection and a data schema for a multidimensional manufacturing route structure, according to embodiments of the invention. With reference to FIG. 15, data can be collected for upload in a number of ways. An XML schema 1502 can be used where the XML schema is a description of a type of XML document, typically expressed in terms of constraints on the structure and content of documents of that type, above and beyond the basic syntactical constraints imposed by XML itself (an example of which is 1504 and 1506 printed out in Appendix A). Also a windows based data Transformer 1502 may be used or a web service with the appropriate API 1502. This allows the data to be accepted as data input as long as the format is pre-negotiated. Once a format file is in place for the data being sent, the data is transmitted using web Basic Authentication with a unique key and password. By this method any type of text data can be transmitted from any type of web client.

A listing of the XML schema (1504 and 1506) are included in Appendix A. The Windows based data Transformer 1502 includes a dynamic link library that facilitates inputting data into the multidimensional manufacturing route database. Transformer permits the output from test machines used in manufacturing routes throughout industry to be transformed using a dynamic link library which facilitates the transformation of the test data into the manufacturing route structure needed for input into the multidimensional manufacturing route database.

Figure 16:
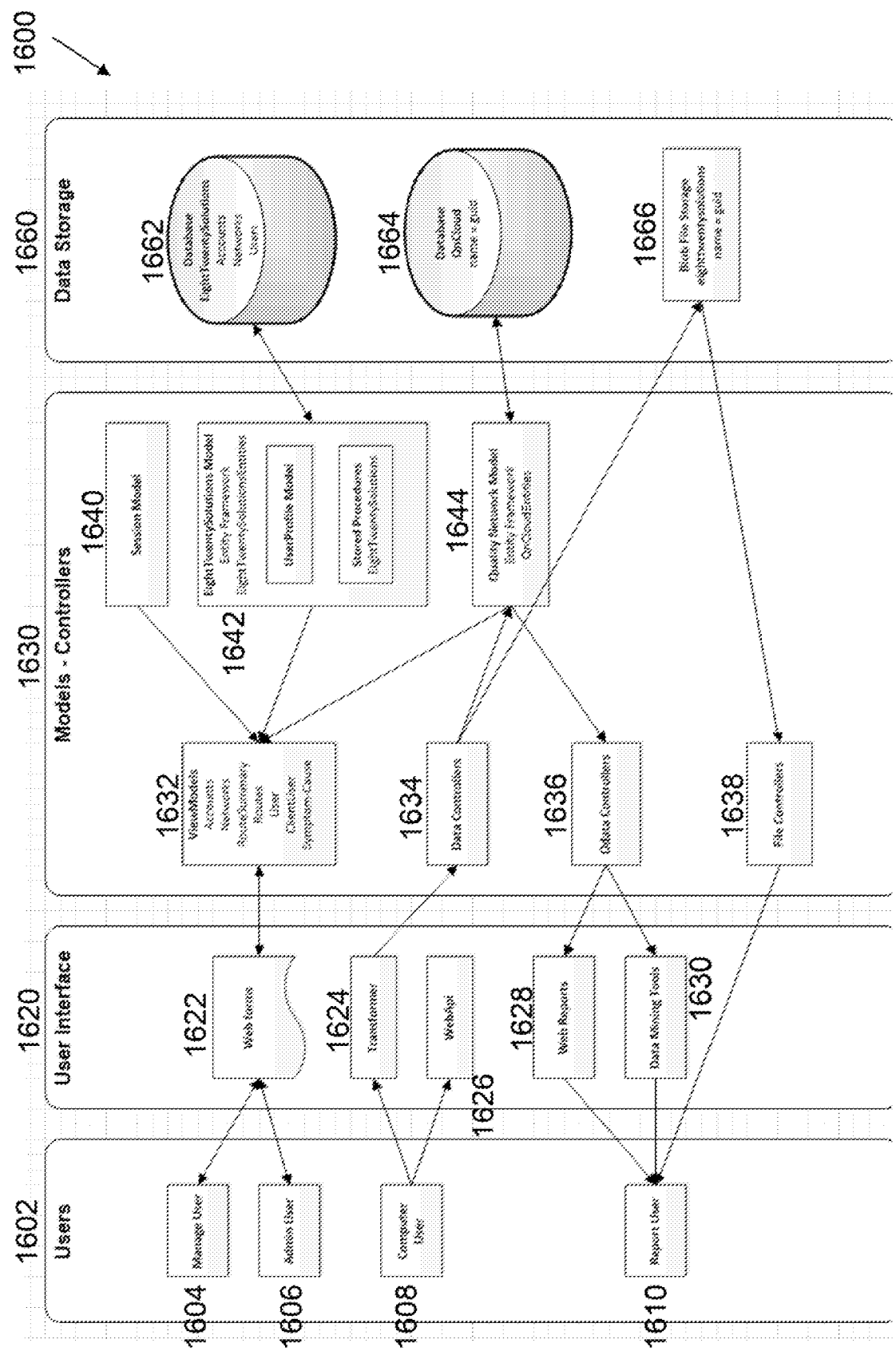
FIG. 16 illustrates a manufacturing data processing system in which embodiments of the invention may be used.

FIG. 16 illustrates, generally at 1600, a manufacturing data processing system in which embodiments of the invention may be used. With reference to FIG. 16, a systems overview for the multidimensional manufacturing route data collection and analysis system is illustrated.

A first section 1602 pertains to users of the system. A second section 1620 illustrates the user interfaces that are used with the system. A third section 1630 shows the models and controllers that are used to setup the multidimensional manufacturing route structure and generate reports both of which are done with the schema discussed above. A fourth section 1660 addresses the actual data storage.

The term "user" is used synonymously with the term "customer" in this description of embodiments. Users indicated by 1604 and 1606 interact with web forms 1622 to define the manufacturing routes. Web forms 1622 create accounts, networks, route summary, routes, users, client user and symptoms, and causes at 1632 utilizing specialized software modules. FIGS. 12A-12A1 and FIG. 12B above are realized through web forms 1622. The manufacturing route dimensions in the database 1664 are configured by the path representing flow from 1622 to 1632 to 1644 to 1664.

Computer users 1608 use Transformer 1624 and WebApi 1626 to input data from the various manufacturing routes utilizing the data controller 1634 and the quality network model 1644 to store dimensional data in the database 1664.

Database 1662 is a management database which is replicated using 1642 and 1640 to form one or more of databases 1664 for a given customer.

When data comes out of the database 1664 to provide a report from path 1664 to 1644 to 1636 to 1628/1630 the data is presented back out through the manufacturing route, the manufacturing route dimensions becomes the dimensions of the report at 160 because the same schema is used to store the data as is used to create a report form the data.

The system stores user database roles in the database configuration itself. The roles are set during the login process. The roles are set during the login process, so that any user may participate in any network, at any user level.

This type of data collection, secure and permanent storage, and easy retrieval for analysis is critical to track the many and geographically diffuse complex assemblies and processes that go into many of today's products. With the advent of components and assemblies originating from multiple sources and from multiple locations, it is beneficial to be able to collect data from these sources and deposit it to a central location and retrieve it from that central location. Using cloud servers, such as those offered by companies such as Amazon, AT&T, Google and others, allow any device connected to the Internet access to reliable data storage. This further allows any company in a supply chain the ability to upload process parameters, reliability data, product/component yields, SPC alerts and any other quantifiable data pertaining to a process, product or component.

Not only are products, processes and components tracked during the assembly of the final product but also data relating to returns and warranty concerns is tracked. Regulatory concerns are also present for many products. For example, many medical products have extensive quality control procedures and tracking requirements. Companies with the ability to quickly look at all the manufacturing data of a product, no matter where fabricated, assembled or tested will have an edge in the competitive marketplace.

Figure 17:
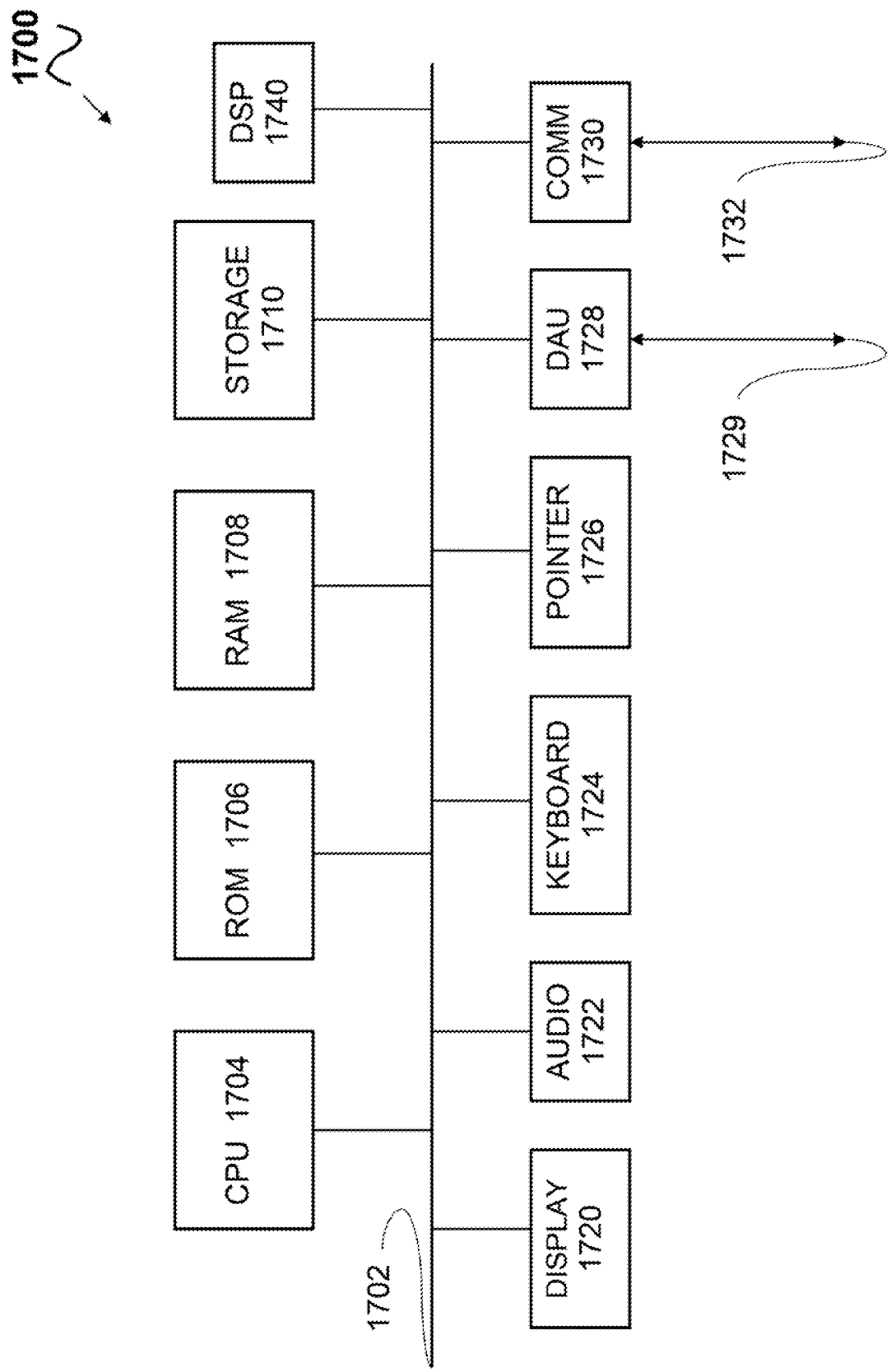
FIG. 17 illustrates another representation of the manufacturing data processing system in which embodiments of the invention may be used.

FIG. 17 illustrates, generally at 1700, another representation of the manufacturing data processing system in which embodiments of the invention may be used. The block diagram is a high-level conceptual representation and may be implemented in a variety of ways and by various architectures. With reference to FIG. 17, bus system 1702 interconnects a Central Processing Unit (CPU) 1704, Read Only Memory (ROM) 1706, Random Access Memory (RAM) 1708, storage 1710, display 1720, audio 1722, keyboard 1724, pointer 1726, data acquisition unit (DAU) 1728, and communications 1730. The bus system 1702 may be for example, one or more of such buses as a system bus, Peripheral Component Interconnect (PCI), Advanced Graphics Port (AGP), Small Computer System Interface (SCSI), Institute of Electrical and Electronics Engineers (IEEE) standard number 1394 (FireWire), Universal Serial Bus (USB), or a dedicated bus designed for a custom application, etc. The CPU 1704 may be a single, multiple, or even a distributed computing resource or a digital signal processing (DSP) chip. Storage 1710 may be Compact Disc (CD), Digital Versatile Disk (DVD), hard disks (HD), optical disks, tape, flash, memory sticks, video recorders, etc. The manufacturing data processing system 1700 is used to receive data from a variety of manufacturing routes as described above. Note that depending upon the actual implementation of the manufacturing data processing system, the manufacturing data processing system may include some, all, more, or a rearrangement of components in the block diagram. In some embodiments, aspects of the system 1700 are performed in software. While in some embodiments, aspects of the system 1700 are performed in dedicated hardware such as a digital signal processing (DSP) chip 1740, or a system on a chip (SOC) which can also be represented at 1740, etc. as well as combinations of dedicated hardware and software as is known and appreciated by those of ordinary skill in the art.

Thus, in various embodiments, manufacturing data is received at 1729 or 1732 for processing by the manufacturing data processing system 1700. Such data can be transmitted at 1732 via communications interface 1730 for further processing in a remote location if 1700 is used to represent a mobile device such as 206 in FIG. 2. Connection with a network, such as an intranet or the Internet is obtained via 1732, as is recognized by those of skill in the art, which enables the manufacturing data processing system 1700 to communicate with other data processing devices or systems in remote locations.

For example, embodiments of the invention can be implemented on a computer system 1700 configured as a desktop computer or work station, on for example a WINDOWS® compatible computer running operating systems such as WINDOWS® XP Home or WINDOWS® XP Professional, WINDOWS® 10 Home or WINDOWS® 10 Professional, Linux, Unix, etc. as well as computers from APPLE COMPUTER, Inc. running operating systems such as OS X, etc. In yet other implementations, embodiments of the invention are configured to be implemented by mobile devices such as a smart phone, a tablet computer, etc. connected to a database which can be located in the cloud as described above. Alternatively, or in conjunction with such an implementation, embodiments of the invention can be configured on a single computing device where the database is stored locally within a manufacturing system without connection to a remote database in the cloud.

In various embodiments, the components of systems as well as the systems described in the previous figures are implemented in an integrated circuit device, which may include an integrated circuit package containing the integrated circuit. In some embodiments, the components of systems as well as the systems are implemented in a single integrated circuit die. In other embodiments, the components of systems as well as the systems are implemented in more than one integrated circuit die of an integrated circuit device which may include a multi-chip package containing the integrated circuit.

For purposes of discussing and understanding the embodiments of the invention, it is to be understood that various terms are used by those knowledgeable in the art to describe techniques and approaches. Furthermore, in the description, for purposes of explanation, numerous specific details are set forth in order to provide a thorough understanding of the present invention. It will be evident, however, to one of ordinary skill in the art that the present invention may be practiced without these specific details. In some instances, well-known structures and devices are shown in block diagram form, rather than in detail, in order to avoid obscuring the present invention. These embodiments are described in sufficient detail to enable those of ordinary skill in the art to practice the invention, and it is to be understood that other embodiments may be utilized and that logical, mechanical, electrical, and other changes may be made without departing from the scope of the present invention.

Some portions of the description may be presented in terms of algorithms and symbolic representations of operations on, for example, data bits within a computer memory. These algorithmic descriptions and representations are the means used by those of ordinary skill in the data processing arts to most effectively convey the substance of, their work to others of ordinary skill in the art. An algorithm is here, and generally, conceived to be a self-consistent sequence of acts leading to a desired result. The acts are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, waveforms, data, time series or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, can refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

An apparatus for performing the operations herein can implement the present invention. This apparatus may be specially constructed for the required purposes, or it may comprise a general-purpose computer, selectively activated or reconfigured by a computer program stored in the computer. Such a computer program may be stored in a computer readable storage medium, such as, but not limited to, any type of disk including floppy disks, hard disks, optical disks, compact disk read-only memories (CD-ROMs), and magnetic-optical disks, read-only memories (ROMs), random access memories (RAMs), electrically programmable read-only memories (EPROM) s, electrically erasable programmable read-only memories (EEPROMs), FLASH memories, magnetic or optical cards, etc., or any type of media suitable for storing electronic instructions either local to the computer or remote to the computer.

The algorithms and displays presented herein are not inherently related to any particular computer or other apparatus. Various general-purpose systems may be used with programs in accordance with the teachings herein, or it may prove convenient to construct more specialized apparatus to perform the required method. For example, any of the methods according to the present invention can be implemented in hard-wired circuitry, by programming a general-purpose processor, or by any combination of hardware and software. One of ordinary skill in the art will immediately appreciate that the invention can be practiced with computer system configurations other than those described, including hand-held devices, multiprocessor systems, microprocessor-based or programmable consumer electronics, digital signal processing (DSP) devices, network PCs, minicomputers, mainframe computers, and the like. The invention can also be practiced in distributed computing environments where tasks are performed by remote processing devices that are linked through a communications network. In other examples, embodiments of the invention as described in the figures above can be implemented using a system on a chip (SOC), a Bluetooth chip, a digital signal processing (DSP) chip, a codec with integrated circuits (ICs) or in other implementations of hardware and software.

The methods of the invention may be implemented using computer software. If written in a programming language conforming to a recognized standard, sequences of instructions designed to implement the methods can be compiled for execution on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, application, driver . . . ), as taking an action or causing a result. Such expressions are merely a shorthand way of saying that execution of the software by a computer causes the processor of the computer to perform an action or produce a result.

It is to be understood that various terms and techniques are used by those knowledgeable in the art to describe communications, protocols, applications, implementations, mechanisms, etc. One such technique is the description of an implementation of a technique in terms of an algorithm or mathematical expression. That is, while the technique may be, for example, implemented as executing code on a computer, the expression of that technique may be more aptly and succinctly conveyed and communicated as a formula, algorithm, mathematical expression, flow diagram or flow chart. Thus, one of ordinary skill in the art would recognize a block denoting A+B=C as an additive function whose implementation in hardware and/or software would take two inputs (A and B) and produce a summation output (C). Thus, the use of formula, algorithm, or mathematical expression as descriptions is to be understood as having a physical embodiment in at least hardware and/or software (such as a computer system in which the techniques of the present invention may be practiced as well as implemented as an embodiment).

Non-transitory machine-readable media is understood to include any mechanism for storing information in a form readable by a machine (e.g., a computer). For example, a machine-readable medium, synonymously referred to as a computer-readable medium, includes read only memory (ROM); random access memory (RAM); magnetic disk storage media; optical storage media: flash memory devices; except electrical, optical, acoustical or other forms of transmitting information via propagated signals (e.g., carrier waves, infrared signals, digital signals, etc.); etc.

As used in this description, "one embodiment" or "an embodiment" or similar phrases means that the feature(s) being described are included in at least one embodiment of the invention. References to "one embodiment" in this description do not necessarily refer to the same embodiment; however, neither are such embodiments mutually exclusive. Nor does "one embodiment" imply that there is but a single embodiment of the invention. For example, a feature, structure, act, etc. described in "one embodiment" may also be included in other embodiments. Thus, the invention may include a variety of combinations and/or integrations of the embodiments described herein.

While the invention has been described in terms of several embodiments, those of skill in the art will recognize that the invention is not limited to the embodiments described, but can be practiced with modification and alteration within the spirit and scope of the appended claims. The description is thus to be regarded as illustrative instead of limiting.

APPENDIX A

Printouts of EtsQnLoad.zip and EtsQnLoad.xsd

EtsQnLoad.zip contains:

| | Name | Type |
|---|---|---|
| | files | File folder |
| | EtsQnLoad.xml | XML File |

The files folder stores any file uploaded with the test information.

Sample printout of EtsQnLoad.xml:

```xml
<?xml version="1.0" encoding="utf-8"?>

<EtsQnLoad xmlns:xsi="http://www.w3.org/2001/XMLSchema-instance" xmlns:xsd="http://www.w3.org/2001/XMLSchema">
  <Product>
    <dateTimeUtc>2012-01-11T16:38:15Z</dateTimeUtc>
    <product>
      <serial_number>XSE00149</serial_number><work_order /><part_number>1234567</part_number>
      <parent_serial_number /><status>1</status>
    </product>
    <attribute>
      <name>rev</name><category /><description /><value>7.6</value><status>1</status>
    </attribute>
    <variable>
      <name>r105</name><category>0</category><description /><unit>ratio</unit><low_limit>0.9964</low_limit>
      <high_limit>1.0036</high_limit><value>1.00022</value><status>1</status>
    </variable>
    <variable>
      <name>r65</name><category>0</category><description /><unit>ohm</unit><low_limit>989.8</low_limit>
      <high_limit>1011.3</high_limit><value>1000.665</value><status>1</status>
    </variable>
    <variable>
      <name>c23</name><category>0</category><description /><unit>F</unit><low_limit>9.409E-10</low_limit>
      <high_limit>1.07E-09</high_limit><value>1.014445E-09</value><status>1</status>
    </variable>
    <variable>
```

```xml
        <name>r178</name><category>0</category><description /><unit>ohm</unit><low_limit>98940</low_limit>
            <high_limit>101070</high_limit><value>100102.5</value><status>1</status>
        </variable>
        <variable>
            <name>r192</name><category>0</category><description /><unit>ohm</unit><low_limit>98960</low_limit>
            <high_limit>101100</high_limit><value>100268.6</value><status>1</status>
        </variable>
        <variable>
            <name>r183</name><category>0</category><description /><unit>ohm</unit><low_limit>9.8</low_limit>
            <high_limit>10.2</high_limit><value>10.02543</value><status>1</status>
        </variable>
        <variable>
            <name>c73</name><category>0</category><description /><unit>F</unit><low_limit>8.5E-11</low_limit>
            <high_limit>1.15E-10</high_limit><value>1.031019E-10</value><status>1</status>
        </variable>
        <variable>
            <name>c78</name><category>0</category><description /><unit>F</unit><low_limit>9.4E-10</low_limit>
            <high_limit>1.1E-09</high_limit><value>1.044359E-09</value><status>1</status>
        </variable>
        <variable>
            <name>c93</name><category>0</category><description /><unit>F</unit><low_limit>1.209E-09</low_limit>
            <high_limit>1.391E-09</high_limit><value>1.287988E-09</value><status>1</status>
        </variable>
        <variable>
            <name>c94</name><category>0</category><description /><unit>F</unit><low_limit>1.012E-09</low_limit>
            <high_limit>1.232E-09</high_limit><value>1.073312E-09</value><status>1</status>
        </variable>
        <variable>
            <name>c52</name><category>0</category><description /><unit>F</unit><low_limit>1.1811E-09</low_limit>
            <high_limit>1.3589E-09</high_limit><value>1.30555E-09</value><status>1</status>
        </variable>
    </Product>
</EtsQnLoad>
```

Listing of EtsQnLoad.xsd

```xml
<?xml version="1.0" encoding="utf-8"?>
<xs:schema
    attributeFormDefault="unqualified"
```

```xml
elementFormDefault="qualified"
xmlns:xs="http://www.w3.org/2001/XMLSchema">
<xs:element name="EtsQnLoad">
  <xs:complexType>
    <xs:sequence>
      <xs:element minOccurs="0" maxOccurs="1" name="Product">
        <xs:complexType>
          <xs:sequence>
            <xs:element name="dateTimeUtc" type="xs:dateTime" />
            <xs:element name="product">
              <xs:complexType>
                <xs:sequence>
                  <xs:element name="serial_number" >
                    <xs:simpleType>
                      <xs:restriction base="xs:string">
                        <xs:maxLength value="50"/>
                      </xs:restriction>
                    </xs:simpleType>
                  </xs:element>
                  <xs:element name="work_order" >
                    <xs:simpleType>
                      <xs:restriction base="xs:string">
                        <xs:maxLength value="50"/>
                      </xs:restriction>
                    </xs:simpleType>
                  </xs:element>
                  <xs:element name="part_number" >
                    <xs:simpleType>
                      <xs:restriction base="xs:string">
                        <xs:maxLength value="50"/>
                      </xs:restriction>
                    </xs:simpleType>
                  </xs:element>
                  <xs:element name="parent_serial_number" >
                    <xs:simpleType>
                      <xs:restriction base="xs:string">
                        <xs:maxLength value="50"/>
                      </xs:restriction>
                    </xs:simpleType>
                  </xs:element>
                  <xs:element name="status">
                    <xs:simpleType>
                      <xs:restriction base="xs:int">
                        <xs:pattern value="0|1"/>
                      </xs:restriction>
                    </xs:simpleType>
```

```xml
        </xs:element>
      </xs:sequence>
    </xs:complexType>
  </xs:element>
  <xs:element minOccurs="0" maxOccurs="unbounded" name="attribute">
    <xs:complexType>
      <xs:sequence>
        <xs:element name="name" >
          <xs:simpleType>
            <xs:restriction base="xs:string">
              <xs:maxLength value="50"/>
            </xs:restriction>
          </xs:simpleType>
        </xs:element>
        <xs:element name="category" >
          <xs:simpleType>
            <xs:restriction base="xs:string">
              <xs:maxLength value="50"/>
            </xs:restriction>
          </xs:simpleType>
        </xs:element>
        <xs:element name="value" >
          <xs:simpleType>
            <xs:restriction base="xs:string">
              <xs:maxLength value="1000"/>
            </xs:restriction>
          </xs:simpleType>
        </xs:element>
        <xs:element name="status">
          <xs:simpleType>
            <xs:restriction base="xs:int">
              <xs:pattern value="0|1"/>
            </xs:restriction>
          </xs:simpleType>
        </xs:element>
      </xs:sequence>
    </xs:complexType>
  </xs:element>
  <xs:element minOccurs="0" maxOccurs="unbounded" name="variable">
    <xs:complexType>
      <xs:sequence>
        <xs:element name="name" >
          <xs:simpleType>
            <xs:restriction base="xs:string">
```

```xml
          <xs:maxLength value="50"/>
        </xs:restriction>
      </xs:simpleType>
    </xs:element>
    <xs:element name="category" >
      <xs:simpleType>
        <xs:restriction base="xs:string">
          <xs:maxLength value="50"/>
        </xs:restriction>
      </xs:simpleType>
    </xs:element>
    <xs:element name="unit" >
      <xs:simpleType>
        <xs:restriction base="xs:string">
          <xs:maxLength value="50"/>
        </xs:restriction>
      </xs:simpleType>
    </xs:element>
    <xs:element name="lsl">
      <xs:simpleType>
        <xs:restriction base="xs:string">
        </xs:restriction>
      </xs:simpleType>
    </xs:element>
    <xs:element name="usl">
      <xs:simpleType>
        <xs:restriction base="xs:string">
        </xs:restriction>
      </xs:simpleType>
    </xs:element>
    <xs:element name="value">
      <xs:simpleType>
        <xs:restriction base="xs:string">
        </xs:restriction>
      </xs:simpleType>
    </xs:element>
    <xs:element name="status">
      <xs:simpleType>
        <xs:restriction base="xs:int">
          <xs:pattern value="0|1"/>
        </xs:restriction>
      </xs:simpleType>
    </xs:element>
  </xs:sequence>
  </xs:complexType>
</xs:element>
```

```xml
<xs:element minOccurs="0" maxOccurs="unbounded" name="symptom">
    <xs:complexType>
      <xs:sequence>
        <xs:element name="name" >
          <xs:simpleType>
            <xs:restriction base="xs:string">
              <xs:maxLength value="50"/>
            </xs:restriction>
          </xs:simpleType>
        </xs:element>
        <xs:element name="category" >
          <xs:simpleType>
            <xs:restriction base="xs:string">
              <xs:maxLength value="50"/>
            </xs:restriction>
          </xs:simpleType>
        </xs:element>
        <xs:element name="value" >
          <xs:simpleType>
            <xs:restriction base="xs:string">
              <xs:maxLength value="2000"/>
            </xs:restriction>
          </xs:simpleType>
        </xs:element>
      </xs:sequence>
    </xs:complexType>
</xs:element>
<xs:element minOccurs="0" maxOccurs="unbounded" name="component">
    <xs:complexType>
      <xs:sequence>
        <xs:element name="manufacturer_pn" >
          <xs:simpleType>
            <xs:restriction base="xs:string">
              <xs:maxLength value="50"/>
            </xs:restriction>
          </xs:simpleType>
        </xs:element>
        <xs:element name="manufacturer" >
          <xs:simpleType>
            <xs:restriction base="xs:string">
              <xs:maxLength value="50"/>
            </xs:restriction>
          </xs:simpleType>
        </xs:element>
```

```xml
<xs:element name="internal_pn" >
  <xs:simpleType>
    <xs:restriction base="xs:string">
      <xs:maxLength value="50"/>
    </xs:restriction>
  </xs:simpleType>
</xs:element>
<xs:element name="refdes" >
  <xs:simpleType>
    <xs:restriction base="xs:string">
      <xs:maxLength value="50"/>
    </xs:restriction>
  </xs:simpleType>
</xs:element>
<xs:element name="lot_code" >
  <xs:simpleType>
    <xs:restriction base="xs:string">
      <xs:maxLength value="50"/>
    </xs:restriction>
  </xs:simpleType>
</xs:element>
<xs:element name="date_code" >
  <xs:simpleType>
    <xs:restriction base="xs:string">
      <xs:maxLength value="50"/>
    </xs:restriction>
  </xs:simpleType>
</xs:element>
<xs:element name="serial_number" >
  <xs:simpleType>
    <xs:restriction base="xs:string">
      <xs:maxLength value="50"/>
    </xs:restriction>
  </xs:simpleType>
</xs:element>
<xs:element name="parent_serial_number" >
  <xs:simpleType>
    <xs:restriction base="xs:string">
      <xs:maxLength value="50"/>
    </xs:restriction>
  </xs:simpleType>
</xs:element>
          </xs:sequence>
        </xs:complexType>
      </xs:element>
    </xs:sequence>
```

```xml
      </xs:complexType>
    </xs:element>
    <xs:element minOccurs="0" maxOccurs="1" name="Process">
      <xs:complexType>
        <xs:sequence>
          <xs:element name="dateTimeUtc" type="xs:dateTime" />
          <xs:element minOccurs="0" maxOccurs="unbounded" name="attribute">
            <xs:complexType>
              <xs:sequence>
                <xs:element name="name" >
                  <xs:simpleType>
                    <xs:restriction base="xs:string">
                      <xs:maxLength value="50"/>
                    </xs:restriction>
                  </xs:simpleType>
                </xs:element>
                <xs:element name="category" >
                  <xs:simpleType>
                    <xs:restriction base="xs:string">
                      <xs:maxLength value="50"/>
                    </xs:restriction>
                  </xs:simpleType>
                </xs:element>
                <xs:element name="value" >
                  <xs:simpleType>
                    <xs:restriction base="xs:string">
                      <xs:maxLength value="1000"/>
                    </xs:restriction>
                  </xs:simpleType>
                </xs:element>
                <xs:element name="status">
                  <xs:simpleType>
                    <xs:restriction base="xs:int">
                      <xs:pattern value="0|1"/>
                    </xs:restriction>
                  </xs:simpleType>
                </xs:element>
              </xs:sequence>
            </xs:complexType>
          </xs:element>
          <xs:element minOccurs="0" maxOccurs="unbounded" name="variable">
            <xs:complexType>
              <xs:sequence>
                <xs:element name="name" >
```

```xml
      <xs:simpleType>
        <xs:restriction base="xs:string">
          <xs:maxLength value="50"/>
        </xs:restriction>
      </xs:simpleType>
    </xs:element>
    <xs:element name="category" >
      <xs:simpleType>
        <xs:restriction base="xs:string">
          <xs:maxLength value="50"/>
        </xs:restriction>
      </xs:simpleType>
    </xs:element>
    <xs:element name="unit" >
      <xs:simpleType>
        <xs:restriction base="xs:string">
          <xs:maxLength value="50"/>
        </xs:restriction>
      </xs:simpleType>
    </xs:element>
    <xs:element name="lsl">
      <xs:simpleType>
        <xs:restriction base="xs:string">
        </xs:restriction>
      </xs:simpleType>
    </xs:element>
    <xs:element name="usl">
      <xs:simpleType>
        <xs:restriction base="xs:string">
        </xs:restriction>
      </xs:simpleType>
    </xs:element>
    <xs:element name="value">
      <xs:simpleType>
        <xs:restriction base="xs:string">
        </xs:restriction>
      </xs:simpleType>
    </xs:element>
    <xs:element name="status">
      <xs:simpleType>
        <xs:restriction base="xs:int">
          <xs:pattern value="0|1"/>
        </xs:restriction>
      </xs:simpleType>
    </xs:element>
</xs:sequence>
```

```xml
        </xs:complexType>
      </xs:element>
      <xs:element minOccurs="0" maxOccurs="unbounded" name="symptom">
        <xs:complexType>
          <xs:sequence>
            <xs:element name="name" >
              <xs:simpleType>
                <xs:restriction base="xs:string">
                  <xs:maxLength value="50"/>
                </xs:restriction>
              </xs:simpleType>
            </xs:element>
            <xs:element name="category" >
              <xs:simpleType>
                <xs:restriction base="xs:string">
                  <xs:maxLength value="50"/>
                </xs:restriction>
              </xs:simpleType>
            </xs:element>
            <xs:element name="value" >
              <xs:simpleType>
                <xs:restriction base="xs:string">
                  <xs:maxLength value="2000"/>
                </xs:restriction>
              </xs:simpleType>
            </xs:element>
          </xs:sequence>
        </xs:complexType>
      </xs:element>
      <xs:element minOccurs="0" maxOccurs="unbounded" name="component">
        <xs:complexType>
          <xs:sequence>
            <xs:element name="manufacturer_pn" >
              <xs:simpleType>
                <xs:restriction base="xs:string">
                  <xs:maxLength value="50"/>
                </xs:restriction>
              </xs:simpleType>
            </xs:element>
            <xs:element name="manufacturer" >
              <xs:simpleType>
                <xs:restriction base="xs:string">
                  <xs:maxLength value="50"/>
                </xs:restriction>
```

```xml
    </xs:simpleType>
   </xs:element>
   <xs:element name="internal_pn" >
    <xs:simpleType>
     <xs:restriction base="xs:string">
      <xs:maxLength value="50"/>
     </xs:restriction>
    </xs:simpleType>
   </xs:element>
   <xs:element name="refdes" >
    <xs:simpleType>
     <xs:restriction base="xs:string">
      <xs:maxLength value="50"/>
     </xs:restriction>
    </xs:simpleType>
   </xs:element>
   <xs:element name="lot_code" >
    <xs:simpleType>
     <xs:restriction base="xs:string">
      <xs:maxLength value="50"/>
     </xs:restriction>
    </xs:simpleType>
   </xs:element>
   <xs:element name="date_code" >
    <xs:simpleType>
     <xs:restriction base="xs:string">
      <xs:maxLength value="50"/>
     </xs:restriction>
    </xs:simpleType>
   </xs:element>
   <xs:element name="serial_number" >
    <xs:simpleType>
     <xs:restriction base="xs:string">
      <xs:maxLength value="50"/>
     </xs:restriction>
    </xs:simpleType>
   </xs:element>
   <xs:element name="parent_serial_number" >
    <xs:simpleType>
     <xs:restriction base="xs:string">
      <xs:maxLength value="50"/>
     </xs:restriction>
    </xs:simpleType>
   </xs:element>
  </xs:sequence>
 </xs:complexType>
```

```
        </xs:element>
       </xs:sequence>
      </xs:complexType>
     </xs:element>
    </xs:sequence>
   </xs:complexType>
  </xs:element>
</xs:schema>
```

END APPENDIX A

What is claimed is:

1. A system to provide product and process improvement of a product comprising:
a manufacturing route, the manufacturing route has a manufacturing route key, the manufacturing route is configured to accept data from a client machine;
a multidimensional data warehouse schema, the data is associated with the manufacturing route key using the multidimensional data warehouse schema to form multidimensional manufacturing route data;
a multidimensional manufacturing route database, the multidimensional manufacturing route data is stored in the multidimensional manufacturing route database, wherein the manufacturing route key identifies the manufacturing route from a plurality of manufacturing routes within the multidimensional manufacturing route database; and
a processor, the processor is configured to:
identify specific data from the multidimensional manufacturing route database that indicates a symptom of a problem occurring within the manufacturing route, wherein the problem is at least one of the following;
a tolerance of the manufacturing route is out of a first acceptable range,
a yield of the manufacturing route is out of a second acceptable range, and
customer satisfaction for the product is out of a third acceptable range, and the specific data is used to identify at least one dimension of the manufacturing route that is contributing to the problem; wherein the processor is configured to receive an input, the input is a cause added in response to a symptom wherein a symptom/cause relationship is established to provide a basis for product and process improvement using data that is extracted from the multidimensional manufacturing route database.

2. The system of claim 1, wherein the multidimensional manufacturing route data is part of a data stream and the data stream contains multidimensional manufacturing route data for a plurality of dimensions associated with the manufacturing route.

3. The system of claim 1, wherein the manufacturing route has dimensions selected from the group consisting of client machine, client process, schema, location and manufacturer.

4. The system of claim 1, wherein the multidimensional manufacturing route data includes product facts and variable facts.

5. The system of claim 1, wherein the processor further comprising:
a components controller, the components controller to present data on an origin of parts used in manufacturing the product responsive to a query triggered by the basis for product improvement, the data is extracted from the multidimensional manufacturing database.

6. The system of claim 1, wherein the multidimensional manufacturing route data includes a symptom fact and a cause fact.

7. The system of claim 6, wherein the processor is used to display symptom data on a data display.

8. The system of claim 7, the processor is used to display a representation of the plurality of manufacturing routes on the data display, wherein the plurality of manufacturing routes are displayed in a progression that corresponds with increasing time through manufacturing.

9. The system of claim 8, wherein the manufacturing route is a route structure that provides cradle-to-grave data collection for the product.

10. A non-transitory computer-readable storage medium storing program code for causing a data processing system to perform steps comprising:
receiving data from a client machine;
associating the data with a manufacturing route key to form multidimensional manufacturing route data wherein a single multidimensional data warehouse schema is used during the associating;
storing the multidimensional manufacturing route data into a multidimensional manufacturing route database, wherein the manufacturing route key identifies a manufacturing route from a plurality of manufacturing routes within the multidimensional manufacturing route database;
identifying specific data from the multidimensional manufacturing route database that indicates a symptom of a problem occurring within the manufacturing route, wherein the problem is at least one of the following;
a tolerance of the manufacturing route is out of a first acceptable range,
a yield of the manufacturing route is out of a second acceptable range, and
customer satisfaction for a product is out of a third acceptable range, and the specific data is used to identify at least one dimension of the manufacturing route that is contributing to the problem; and
receiving an input, the input is a cause added in response to a symptom wherein a symptom/cause relationship is established to provide a basis for product and process improvement of the product using data that is extracted from the multidimensional manufacturing route database.

11. The non-transitory computer-readable storage medium of claim 10, wherein the multidimensional manufacturing route data is part of a data stream and the data stream contains multidimensional manufacturing route data for a plurality of dimensions associated with the manufacturing route.

12. The non-transitory computer-readable storage medium of claim 10, wherein the manufacturing route has dimensions selected from the group consisting of client machine, client process, schema, location and manufacturer.

13. The non-transitory computer-readable storage medium of claim 10, wherein the multidimensional manufacturing route data includes product facts and variable facts.

14. The non-transitory computer-readable storage medium of claim 10, further comprising:
utilizing a components controller to present data on an origin of parts used in manufacturing the product responsive to the basis for product improvement, the data is extracted from the multidimensional manufacturing route database.

15. The non-transitory computer-readable storage medium of claim 10, wherein the multidimensional manufacturing route data includes a symptom fact and a cause fact.

16. The non-transitory computer-readable storage medium of claim 15, wherein the processor is used to display symptom data on a data display.

17. The non-transitory computer-readable storage medium of claim 16, the processor is used to display a representation of the plurality of manufacturing routes on the data display, wherein the plurality of manufacturing routes are displayed in a progression that corresponds with increasing time through manufacturing.

18. The non-transitory computer-readable storage medium of claim 17, wherein the manufacturing route is a route structure that provides cradle-to-grave data collection for the product.

\* \* \* \* \*